United States Patent
Hirata et al.

(10) Patent No.: US 7,962,239 B2
(45) Date of Patent: Jun. 14, 2011

(54) SEWING MACHINE AND SEWING MACHINE OPERATING PROGRAM RECORDED ON COMPUTER-READABLE RECORDING MEDIUM

(75) Inventors: Takashi Hirata, Nagoya (JP); Takafumi Naka, Ama-gun (JP); Tsuneo Okuyama, Inben-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1015 days.

(21) Appl. No.: 11/822,091

(22) Filed: Jul. 2, 2007

(65) Prior Publication Data
US 2008/0006193 A1 Jan. 10, 2008

(30) Foreign Application Priority Data
Jul. 7, 2006 (JP) .................... 2006-188312

(51) Int. Cl.
*D05B 21/00* (2006.01)
(52) U.S. Cl. .................... 700/136; 112/470.01
(58) Field of Classification Search .......... 700/136, 700/137, 138; 112/470.02, 445, 470.01
See application file for complete search history.

(56) References Cited

U.S. PATENT DOCUMENTS

| | | | | |
|---|---|---|---|---|
| 4,834,007 A * | 5/1989 | Miyazaki et al. | ........ | 112/470.04 |
| 5,184,560 A * | 2/1993 | Asano | ........ | 112/470.02 |
| 5,191,536 A * | 3/1993 | Komuro et al. | ........ | 700/138 |
| 5,228,402 A * | 7/1993 | Sugimoto | ........ | 112/102.5 |
| 5,228,403 A * | 7/1993 | Sugimoto | ........ | 112/470.06 |
| 5,261,341 A * | 11/1993 | Asano | ........ | 112/102.5 |
| 5,282,142 A * | 1/1994 | Asano | ........ | 700/138 |
| 5,303,665 A | 4/1994 | Hausammann | | |
| 5,319,565 A | 6/1994 | Hausammann et al. | | |
| 5,320,054 A * | 6/1994 | Asano | ........ | 112/102.5 |
| 5,335,182 A * | 8/1994 | Asano | ........ | 700/138 |
| 5,359,949 A * | 11/1994 | Asano | ........ | 112/470.02 |
| 5,379,707 A * | 1/1995 | Asano | ........ | 112/102.5 |
| 5,392,724 A * | 2/1995 | Kurono et al. | ........ | 112/102.5 |
| 5,438,520 A * | 8/1995 | Satoh et al. | ........ | 700/132 |
| 5,592,891 A * | 1/1997 | Muto | ........ | 112/475.19 |
| 5,648,908 A * | 7/1997 | Chirn et al. | ........ | 700/135 |
| 5,765,493 A * | 6/1998 | Akahane et al. | ........ | 112/167 |
| 5,791,272 A * | 8/1998 | Akahane et al. | ........ | 112/220 |
| 5,791,274 A * | 8/1998 | Akahane et al. | ........ | 112/470.04 |
| 5,794,554 A * | 8/1998 | Akahane et al. | ........ | 112/470.01 |

(Continued)

FOREIGN PATENT DOCUMENTS

JP      U-04-012031       1/1992

(Continued)

*Primary Examiner* — Danny Worrell
(74) *Attorney, Agent, or Firm* — Oliff & Berridge, PLC

(57) ABSTRACT

A sewing machine and a sewing machine operating program stored on a computer-readable medium for changing display items displayed on a liquid crystal display of a sewing machine on a page by page basis, when an output signal of an operation of rolling forward or backward a mouse wheel is detected. The sewing machine may include a display device that displays a variety of information related to sewing and a display item storage device that stores display items to be displayed on the display device. The sewing machine may also include an operation device that includes an operating member for performing plural types of operations and a display control device that changes the display item displayed on the display device in response to at least one of the operation type or the operation quantity outputted by the operation device.

24 Claims, 14 Drawing Sheets

U.S. PATENT DOCUMENTS

| | | | |
|---|---|---|---|
| 5,865,134 A * | 2/1999 | Okuyama et al. | 112/102.5 |
| 5,881,657 A * | 3/1999 | Asano | 112/102.5 |
| 5,904,109 A * | 5/1999 | Asano | 112/102.5 |
| 5,954,005 A * | 9/1999 | Sekine et al. | 112/470.04 |
| 5,974,992 A * | 11/1999 | Asano | 112/102.5 |
| 6,289,831 B1 * | 9/2001 | Hanai et al. | 112/102.5 |
| 6,405,097 B1 * | 6/2002 | Asano | 700/138 |
| 6,836,695 B1 * | 12/2004 | Goldman | 700/137 |
| RE38,718 E * | 3/2005 | Futamura | 700/138 |
| 6,947,808 B2 * | 9/2005 | Goldman | 700/138 |
| 6,996,451 B1 * | 2/2006 | Asai et al. | 700/136 |
| 7,016,756 B2 * | 3/2006 | Goldman | 700/138 |
| 7,016,757 B2 * | 3/2006 | Goldman | 700/138 |
| 7,089,079 B2 * | 8/2006 | Kaiya et al. | 700/136 |
| 7,587,256 B2 * | 9/2009 | Goldman | 700/138 |

FOREIGN PATENT DOCUMENTS

| | | |
|---|---|---|
| JP | A-04-261697 | 9/1992 |
| JP | A-05-042268 | 2/1993 |
| JP | A-05-161770 | 6/1993 |
| JP | A-07-088265 | 4/1995 |
| JP | A-09-016085 | 1/1997 |
| JP | A-09-122364 | 5/1997 |
| JP | A-09-170161 | 6/1997 |

* cited by examiner

FIG. 5

| DISPLAY SEQUENTIAL ORDER | CATEGORY NUMBER | PAGE |
|---|---|---|
| 1 | 1 | 1 |
| 2 | 1 | 2 |
| 3 | 2 | 1 |
| 4 | 3 | 1 |
| 5 | 4 | 1 |
| 6 | 5 | 1 | ns
SEWING MACHINE AND SEWING MACHINE OPERATING PROGRAM RECORDED ON COMPUTER-READABLE RECORDING MEDIUM

CROSS-REFERENCE TO RELATED APPLICATION

This application claims priority from JP2006-188312, filed Jul. 7, 2006, the entire disclosure of which is hereby incorporated by reference.

BACKGROUND

The related technical fields include a sewing machine and a sewing machine operating program recorded on a computer-readable recording medium. The related technical fields include a sewing machine equipped with a display device for displaying a plurality of sewing patterns and a variety of information related to sewing, and an operating program of such as a sewing machine recorded on a computer-readable recording medium.

Conventionally, a storage area of a control unit of an electronically controlled sewing machine stores pattern data for sewing a variety of patterns, such as a plurality of utility stitch patterns, a variety of decorative stitch patterns, and embroidery patterns of characters or graphics. Further, this storage area stores in advance handling information or the like for explaining a sewing method, explaining a sewing machine maintenance method, or the like. In addition, such a sewing machine is equipped with a display device such as a liquid crystal display for displaying these display items and a selection device such as a touch panel. Via the selection device, a user may select a desired pattern from among a plurality of patterns displayed on the display device, or sequentially display handling information on the display device on a one-by-one screen basis.

SUMMARY

In such a conventional sewing machine, a variety of display items may be displayed on a display device, and it is necessary to display sewing machine handling information over a plurality of screens on the display device.

There has been proposed a sewing information display apparatus equipped with: an information storage means for storing data for displaying handling information on each screen and screen indicating information for indicating the presence or absence of handling information that extends to a screen before and after each screen in association with each other; and a display control means for controlling the display contents of the display means, thereby displaying the corresponding screen indicating information on each screen, on which handling information has been displayed (Japanese Patent Application Laid-open No. 9-122364, for example). According to this sewing information display apparatus, even when there has been an explanatory statement over a plurality of screens, these screens may be displayed by selecting "Previous page/Next page" key.

However, the operation has been complicated when a sewing machine in which patterns are classified into a plurality of categories in accordance with features of the patterns, so that a user may easily select a desired pattern from among them, and then, the patterns are displayed on a category-by-category basis. Specifically, if the user refers to these patterns over several categories, selecting a category and changing the displayed pages in the category are both required, and thus an operation for displaying the desired pattern has been complicated.

Exemplary embodiments provide a sewing machine with improved operability for displaying and selecting a desired display item, and a sewing machine operating program recorded on a computer-readable recording medium.

Exemplary embodiments include a sewing machine that includes: a display device that displays a variety of information relating to sewing; a display item storage device that stores display items to be displayed on the display device; an operation device that has an operating member for making plural types of operations including a first operation and a second operation, the second operation being different from the first operation, and that outputs as an output signal at least one of an operation type and an operation quantity in accordance with an operation of the operating member; and a display control device that changes the display item displayed on the display device responsive to at least one of the operation type or the operation quantity output by the operation device.

In addition, the exemplary embodiments also provide a sewing machine operating program recorded on a computer-readable recording medium, the program including instructions for acquiring at least one of an operation type or an operation quantity of plural types of operations including a first operation and a second operation, the second operation being different from the first operation; and instructions for changing the display item being displayed responsive to at least one of the operation type or the operation quantity acquired in the operating information acquisition step.

BRIEF DESCRIPTION OF THE DRAWINGS

Exemplary embodiments of the disclosure are described below in detail with reference to the accompanying drawings in which:

FIG. 5 is an explanatory view of a page to which utility stitch patterns to be displayed on a pattern selection screen have been assigned, and categories and display sequential order assigned to that page;

DETAILED DESCRIPTION OF THE EXEMPLARY EMBODIMENTS

Exemplary embodiments of a sewing machine according to this disclosure are described below with reference to the accompanying drawings. Now, a first exemplary embodiment is an example where the present disclosure is applied to a sewing machine, which forms stitches on a work cloth while moving the work cloth relatively to a vertically moving needle. First, a physical configuration and an electrical configuration of a sewing machine 1 in accordance with this exemplary embodiment are described.

Figure 1:
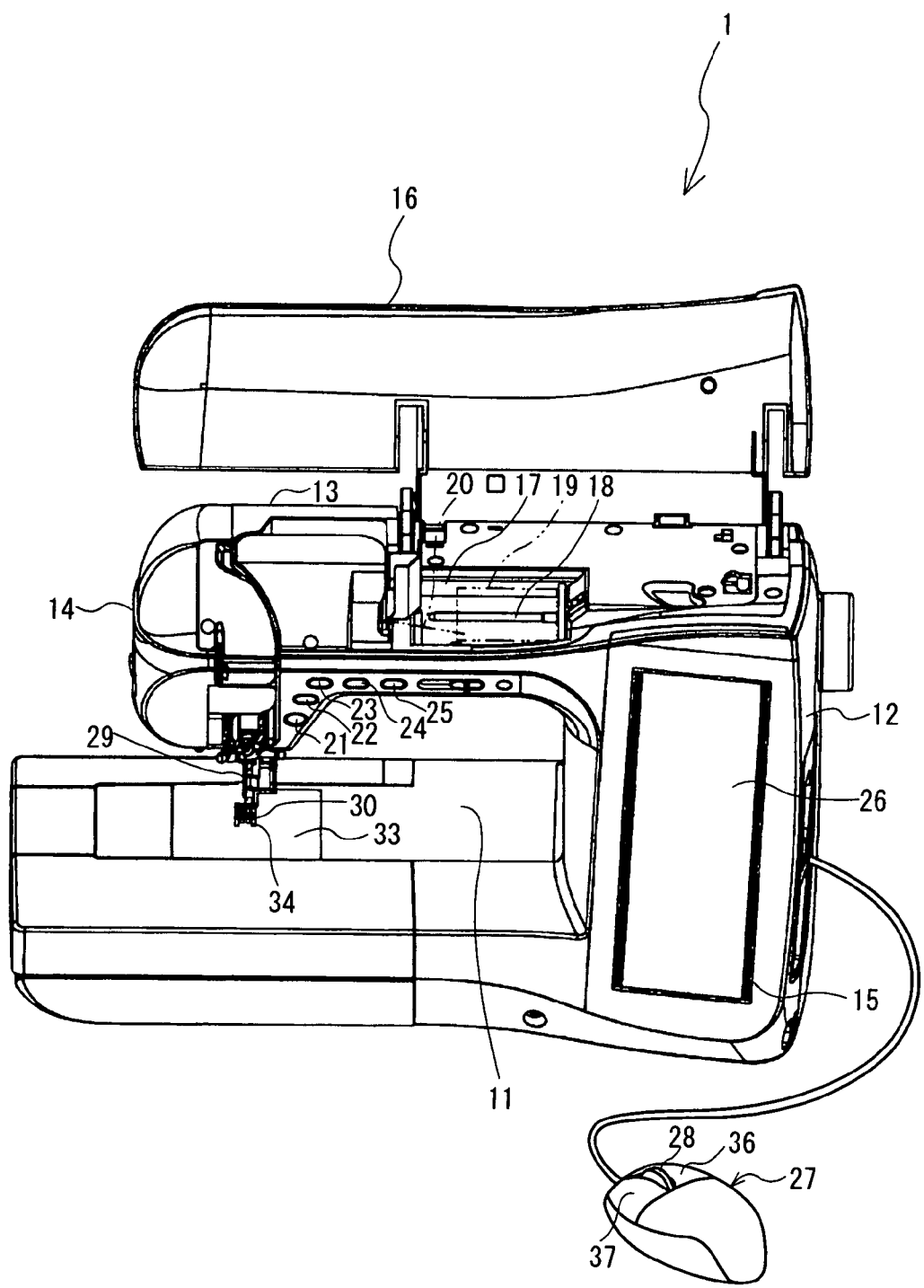
FIG. 1 is a perspective view of a sewing machine with a cover 16 opened.

The physical configuration of the sewing machine 1 is described with reference to FIG. 1. As shown in FIG. 1, the sewing machine 1 may be equipped with: a transversely elongated sewing machine bed 11; a pillar 12 that erects upwardly from a right end part of the sewing machine bed 11; and an arm portion 13 that extends from an upper end of the pillar 12 to the leftward direction. A left distal end of the arm portion 13 may be referred to as a head portion 14. In the sewing machine bed 11, there may be provided: a needle plate 33; a feed dog 34; a cloth feed mechanism (not shown); a feed adjustment pulse motor 78 (refer to FIG. 2); and a shuttle mechanism (not shown). The needle plate 33 may be arranged on a top face of the sewing machine bed 11. The feed dog 34 may be provided on the lower side of the needle plate 33, and may move a work cloth (not shown) to be sewn by a predetermined feed quantity. The cloth feed mechanism may drive the feed dog 34. The feed adjustment pulse motor 78 may adjust the feed quantity of a work cloth caused by the feed dog 34. In the head potion 14, there may be provided a needle bar mechanism (not shown); a needle bar swinging pulse motor 80 (refer to FIG. 2); and a thread take-up mechanism (not shown). The needle bar mechanism may longitudinally drive the needle bar (not shown) with a sewing needle 29 attached. A needle bar swinging pulse motor 80 may transversely swing the needle bar. The above-described elements may be controlled by means of a control device composed of a microcomputer or the like incorporated in the sewing machine 1.

A liquid crystal display 15 having an elongated rectangular shape may be provided on a front face of the pillar 12. The liquid crystal display 15 may display, for example, a variety of patterns, function names for executing a variety of functions required for sewing, and a variety of messages and the like.

On the front face of the liquid crystal display 15, a touch panel 26 may be provided, corresponding to each of the display positions of pattern names of a plurality of patterns, function names for executing a variety of functions, numeric value settings on a variety of setting screens and the like. The numeric value settings on a variety of setting screens, for example, may include a feed quantity of a work cloth by means of the feed adjustment pulse motor 78 and a needle bar swinging quantity caused by the needle bar swinging pulse motor 80. When a portion of the touch panel 26 corresponding to a pattern display portion or a setting portion of a screen displayed on the liquid crystal display 15 are pressed with a finger or a dedicated touch pen, a user may select, for example, a pattern to be sewn, direct operation of a function, or set a numeric value and the like (hereinafter, this operation is referred to as a "panel operation").

In addition, a mouse 27, for example, a rotary input device equipped with a mouse wheel 28, may be connected to the right side face of the pillar 12 shown in FIG. 1. The mouse 27 may be equipped with a movement quantity detection portion 35 (refer to FIG. 3). The mouse 27 may output an output signal that directs movement of a display position of a cursor or a pointer (hereinafter, both simply referred to as a "cursor") in response to the movement quantity of the mouse 27 detected by a movement quantity detection portion 35. In addition, the mouse 27 may output an output signal that directs a change in the display items displayed on the liquid crystal display 15 when the mouse wheel 28 is rolled forward or backward. In the first exemplary embodiment, a user may operate the mouse 27, thereby moving the cursor to a display position of a selection key displayed on a screen (hereinafter, this moving operation is referred to as "mouse movement operation"), and then, the selection key may be selected by clicking a left button 37 of the mouse 27 (hereinafter, referred to as "mouse selection operation"). In addition, although not shown in FIG. 1, a connector 38 (refer to FIG. 2) capable of connecting an external storage device 39, such as, a memory card, may also be provided on the right side face of the pillar 12. Via the connector 38, it may be possible to introduce a variety of sewing information data or a variety of programs into the sewing machine 1 from the external storage device 39 or to output the data or programs outside of the sewing machine 1, for example, to a computer.

Now, examples of operations of a mouse wheel 28 of the mouse 27, shown in FIG. 1, are described. The mouse wheel 28, which may be a disk-shaped rotator having a predetermined thickness, is axially supported on the mouse 27 to enable rolling. The mouse wheel 28 may be rolled backward (towards the user) or forward (away from the user). In the exemplary embodiment, a first operation may be assigned to rolling backward and a second operation may be assigned to rolling forward, respectively, and an operation type may be outputted. An output signal of the mouse wheel 28 may be assigned so that the first operation increases a display sequential order by 1 and the second operation decreases a display sequential order by 1 in response to any rolling quantity. As described above, a correlation between an operation type of the mouse wheel 28 and its rotational quantity, and increment and decrement quantity of a page by 1 may be defined.

The liquid crystal display 15 may have an elongated rectangular shape, and a ratio between a long side in a vertical direction and a short side in a horizontal direction may be defined as about 2.5:1. Movement of the cursor displayed on the liquid crystal display 15 may be directed by a movement quantity of the mouse 27 detected by the movement quantity detection portion 35, as described previously. A movement quantity of the mouse 27 for moving the cursor from one end to the other end of the liquid crystal 15 in the vertical direction, that is, a longitudinal direction, may be larger in comparison with that for moving the cursor from one end to the other end of it in a horizontal direction, that is, a transverse direction, thus impairing operability. Therefore, in the exemplary embodiment, a movement ratio of the movement in the longitudinal direction may be set at a value greater than that of the movement in the transverse direction.

Here, the movement ratio may be defined as a ratio correlating a mouse movement quantity over a unit distance with a corresponding cursor movement quantity. In the exemplary embodiment, a movement ratio in a vertical direction may be set to be twice of a movement ratio in a transverse direction. The movement quantity of the cursor corresponding to the output from the mouse 27 may be obtained by: first extracting an X-direction (horizontal direction) component and a Y-direction (vertical direction) component from the mouse movement quantity; and then performing a calculation in accordance with these components and movement ratios corresponding thereto. Thus, when a cursor is moved in a vertical direction (longitudinal direction) on an elongated screen, a movement distance of the cursor due to the movement of the mouse 27 in the vertical direction may be twice of that of the cursor due to the movement in a transverse direction. Therefore, when the cursor is moved by a predetermined quantity C in the longitudinal direction of the liquid crystal display 15 with a mouse movement operation, an operation quantity may be reduced in comparison to when the cursor is moved by the same quantity C in the transverse direction of the liquid crystal display 15. In other words, operability may be improved for moving the cursor displayed on the liquid crystal display 15. The movement ratio may be defined as a fixed value in advance, or a desired movement ratio may be defined by a user. Alternatively, the movement ratio may be switched between two modes, for example, a first mode in which the movement ratio is defined in accordance with the cursor movement direction and a second mode in which a predetermined value is employed regardless of the movement direction.

Now, a configuration of an arm portion 13 is described. On the arm portion 13, a cover 16 for opening/closing a top side of the arm portion may be mounted. The cover 16 may be provided in a longitudinal direction of the arm portion 13, and may be axially supported to enable opening/closing around a transversely oriented shaft, at the rear end part on the arm portion 13. A thread housing portion 17, which is, for example, a recessed portion for housing a thread spool 19 that supplies a thread to a sewing machine 1, may be provided in the vicinity of the top center of the arm portion 13. From an internal wall face of the side of the pillar 12 of this thread housing portion 19, a thread spool pin 18 may protrude toward the head portion 14 for installing the thread spool 19. An upper thread 20 extending from the thread spool 19 may be supplied to a sewing needle 29 installed on a needle bar via a thread leading portion (not shown), which may be provided in the head portion 14 and may include a tensioner and a thread take-up spring for adjusting a tension of a thread, thread take-up lever for pulling up the upper thread 20 while reciprocating in a vertical direction, and the like.

In addition, in the arm portion 13, there may be provided a drive shaft (not shown) that is rotationally driven by means of a sewing machine motor 79 (refer to FIG. 2) and that is extended in the longitudinal direction of the arm portion 13. A needle bar mechanism (not shown) and a thread take-up mechanism (not shown) may be driven by means of rotation of this drive shaft.

On a front lower part of the arm portion 13, switches such as a sewing start/stop switch 21, a reverse stitch switch 22, a needle up/down switch 23, a presser foot up/down switch 24, and an automatic threading switch 25, may be provided. The sewing start/stop switch 21 may start and stop operation of the sewing machine 1. In other words, this switch may be intended to direct sewing start and stop. The reverse stitch switch 22 may serve as a switch for feeding a work cloth in a direction opposite of the normal, that is, from the rear side to the front side. The needle up/down switch 23 may serve as a switch for vertically changing a stop position of a needle bar. A presser foot up/down switch 24 may serve as a switch for directing an operation of moving a presser foot 30 up and down. The automatic threading switch 25 may serve as a switch for directing automatic threading for leading the upper thread through a thread take-up lever, tensioner, and a thread take-up spring and finally for threading a sewing needle 29.

In addition, in the head portion 14, which is a left distal end part of the arm portion 13, an automatic thread leading device and an automatic threading mechanism and the like, may be provided, although not shown, as well as a needle bar, a thread take-up lever, a tensioner, and a thread take-up spring described previously. In addition, a presser bar (not shown), which may be supported by a sewing machine frame to enable elevation, may be arranged at the rear side of the needle bar. A presser foot 30 may be mounted on a lower end part of the presser bar for pressurizing a work cloth.

Figure 2:
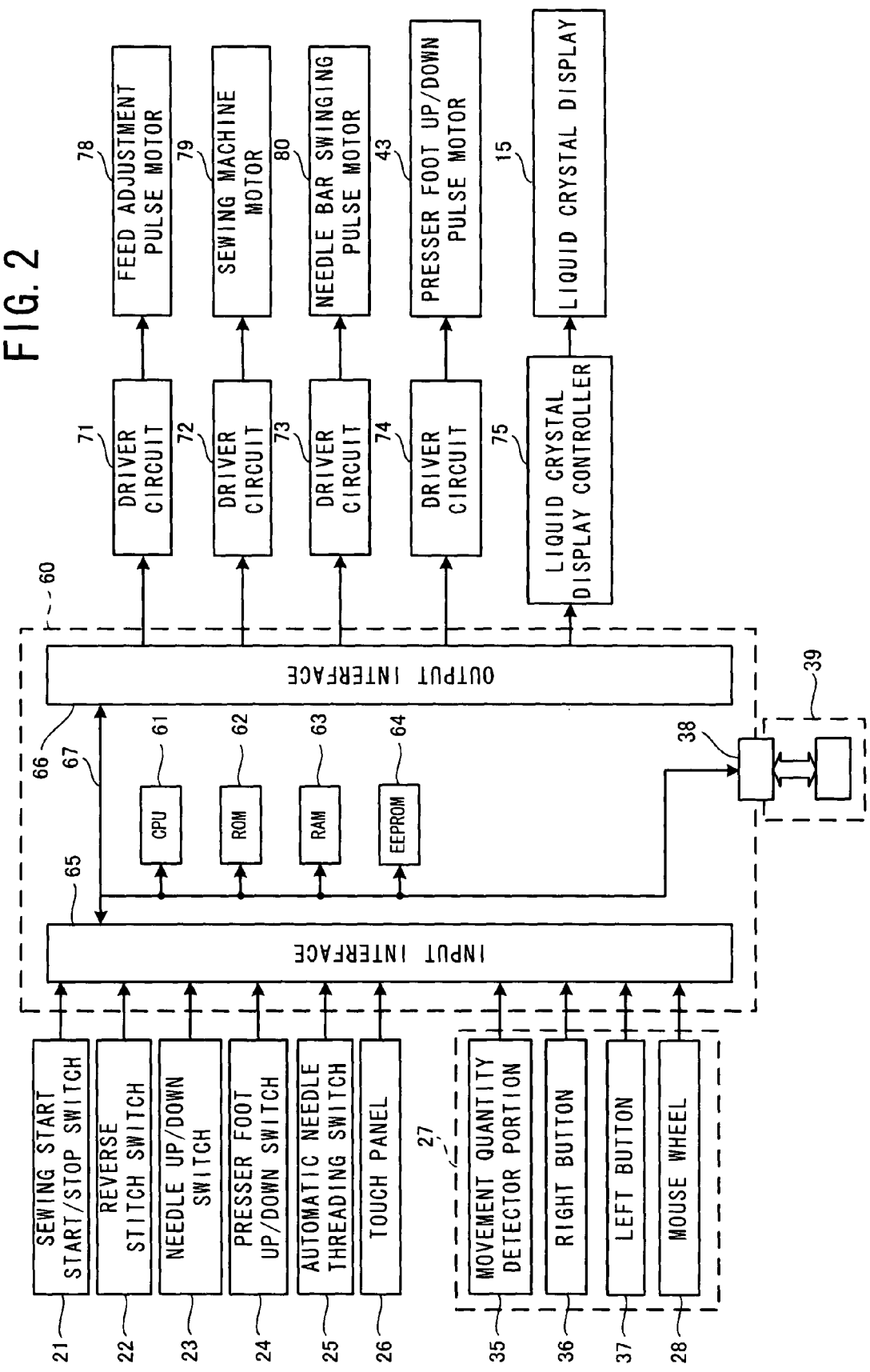
FIG. 2 is a block diagram of an electrical configuration of the sewing machine.
Figure 3:
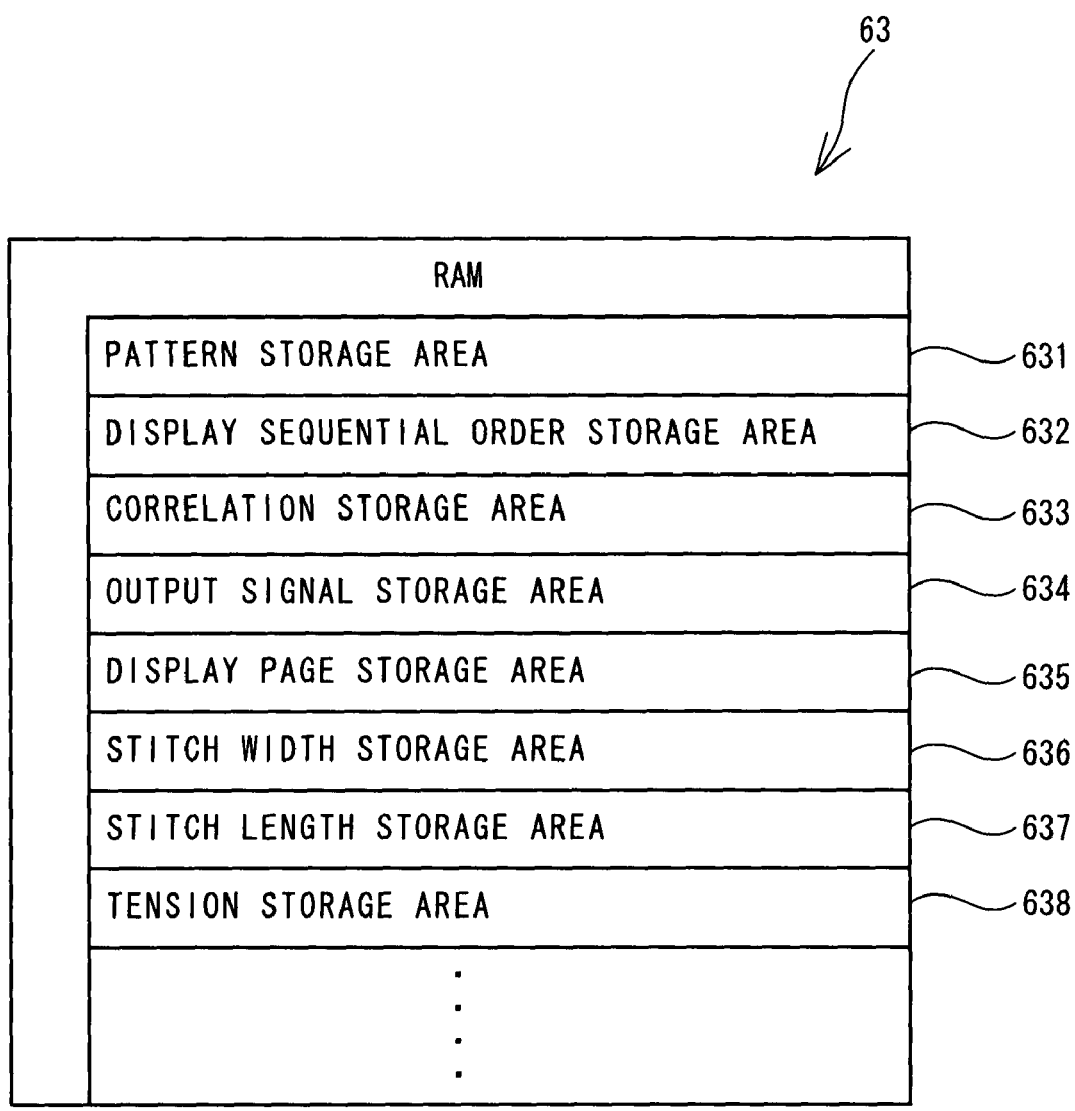
FIG. 3 is a conceptual view of a storage area of a RAM.

Now, an electrical configuration of a sewing machine 1 is described with reference to FIG. 2 and FIG. 3. As shown in FIG. 2, a control portion 60 of the sewing machine 1 may include a CPU 61, a ROM 62, a RAM 63, an EEPROM 64, an input interface 65, an output interface 66, and a connector 38, and the like, and these may be interconnected by means of a bus 67. In addition, the sewing start/stop switch 21, the reverse stitch switch 22, the needle up/down switch 23, the presser foot up/down switch 24, the automatic threading switch 25, the touch panel 26, the mouse 27, and the like, may be connected to the input interface 65. The mouse 27 may output: an output signal that is based on an operation of each of its operating members, such as, a right button 36, a left button 37, and a mouse wheel 28; and an output signal that is based on a movement quantity of the mouse 27 detected by a movement quantity detection portion 35. On the other hand, to an output interface 66, a feed adjustment pulse motor 78, a sewing machine motor 79 for rotationally driving a drive shaft, a needle bar swinging pulse motor 80 for swinging a needle bar, a presser foot up/down pulse motor 43, and the liquid crystal display 15 may be electrically connected via driver circuits 71 to 74 and a liquid crystal display controller 75, respectively.

A detailed description is now given below with respect to the CPU 61, the ROM 62, and the RAM 63, which constitute the control portion 60 of the sewing machine 1. The CPU 61 may be responsible for main control of the sewing machine 1, and may execute a variety of computations and processing operations for executing sewing in accordance with a sewing control program stored in the ROM 62. In addition, the CPU 61 may execute a variety of computations and processing operations for changing display items displayed on a liquid crystal display 15 in accordance with a sewing machine operating program stored in the ROM 62. The sewing machine operating program may be stored in an external storage device 39 such as a memory card. In that case, the program may be read into the RAM 63, and the executed.

The ROM 62 may be equipped with a sewing control program storage area, in which a sewing control program that drives and controls a variety of drive mechanisms, and executes pattern selection control for selecting a variety of patterns or a variety of display controls. Further, the ROM 62 may be equipped with a sewing machine operation program storage area, in which a sewing machine operating program that controls change of display items to be displayed on the liquid crystal display 15. In addition, the ROM 62 may store a variety of sewing information data described later, which may include plural types of pattern data and a variety of data corresponding to these types of pattern data. Part or all of these various types of sewing information data may be stored in an EEPROM 64 or the data stored in the external storage device 39 may be read into the sewing machine 1.

A RAM 63 may be a storage element, which is randomly readable and writable. A variety of storage areas may be provided as required to store a variety of sewing information data read out from the ROM 62, a variety of settings read out from the EEPROM 64, and a computation result obtained by computation processing of the CPU 61. The storage areas of the RAM 63 are described in detail with reference to FIG. 3. As shown in FIG. 3, the storage areas of RAM 63 may include: a pattern storage area 631; a display sequential order storage area 632; a correlation storage area 633; an output signal storage area 634; a display page storage area 635; a stitch width storage area 636; a stitch length storage area 637; and a tension storage area 638.

The pattern storage area 631 may store plural types of patterns that are read out from the ROM 62. Each pattern may be in association with a category number, an intra-category number, a stitch pattern, a pattern name, a page to be displayed on a pattern selection screen of the liquid crystal display 15, and display position on the page. The category number may serve as an ID of a category classified in accordance with the intended use of the patterns. The display sequential order storage area 632 may store the display sequential order and category of each of the pages to which the patterns are assigned. The correlation storage area 633 may store a correlation between an output signal of a mouse 27 equipped with a mouse wheel 28 and a change quantity of a display item. In the exemplary embodiment, the correlation storage area 633 may store a correlation between a type of operation of the mouse wheel 28 and its rotation quantity, and a page increment/decrement 1 described previously. The output signal storage area 634 may store an output signal of the mouse 27 equipped with the mouse wheel 28. The display page storage area 635 may store a display sequence of a display page, that is, a page currently displayed on the liquid crystal display 15. The stitch width storage area 636 may store a stitch width, which is a width of a zigzag stitch in a pattern and an upper and lower limit value of the stitch width for each pattern. The stitch length storage area 637 may store a stitch length of a pattern and an upper and lower limit value of the stitch length for each pattern. The tension storage area 638 may store a tension of the upper thread and an upper and lower limit value of the tension for each pattern.

Now, procedures for a process of the exemplary embodiment, for operating a screen displayed on the liquid crystal display 15 of the sewing machine 1, is described with reference to FIG. 4 to FIG. 9. Described with reference to "Example 1" are examples of: utility stitch patterns to be displayed on a pattern selection screen 104 in a screen 100 shown in FIG. 4 that may be changed by operating the mouse wheel 28 of the mouse 27; a program that may execute a page change process shown in FIG. 6 that is stored in the ROM 62, and then, may be execute by means of the CPU 61 shown in FIG. 2; and a variety of information required for executing the page change process that may be read out from the ROM 62, the EEPROM 64, or the external storage device 39, and then, may be stored in a predetermined storage area of the RAM 63.

Figure 4:
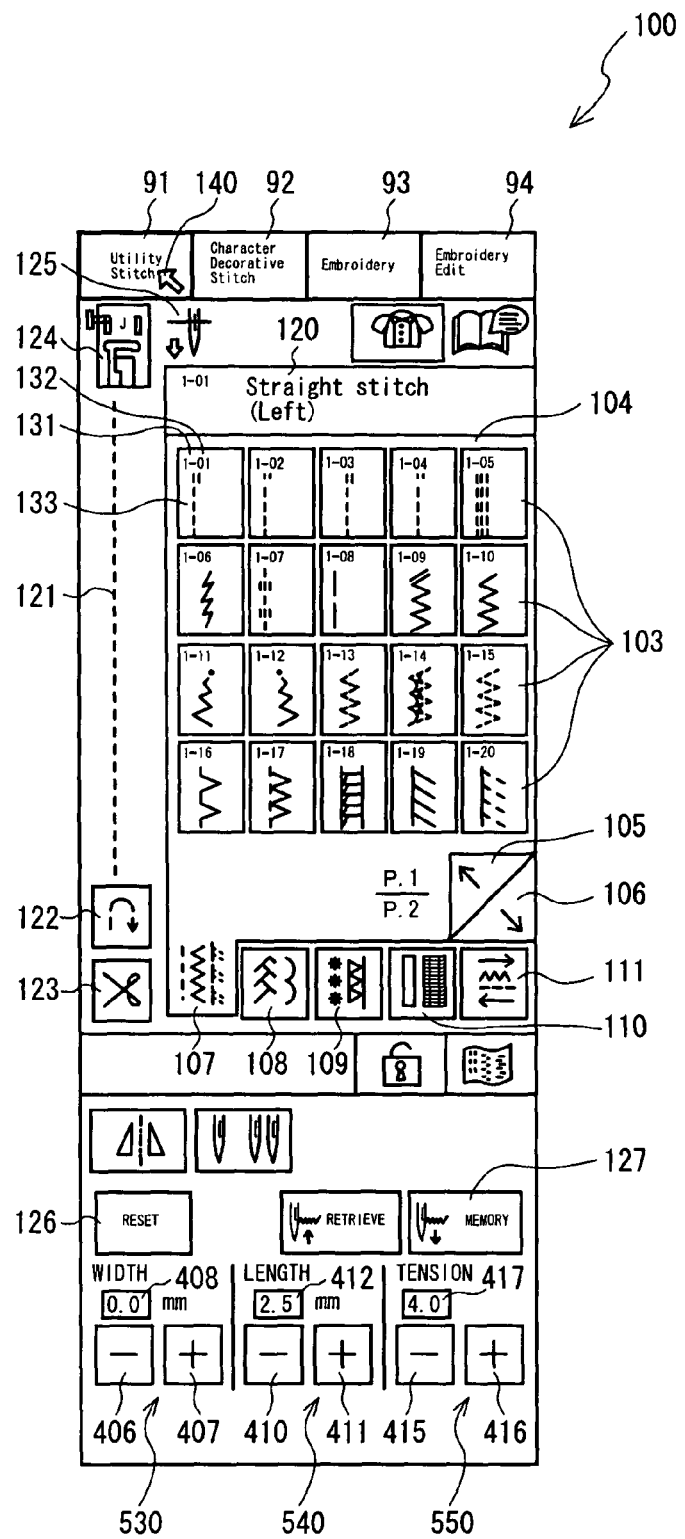
FIG. 4 is an explanatory view of a screen displayed on a liquid crystal display 15.

First, the screen 100 displayed on the liquid crystal display 15 is described with reference to FIG. 4. As shown in FIG. 4, the screen 100 may display a variety of input selection keys, in addition to several item display areas that each constitute a partial display area of the screen 100. The item display areas may include: the pattern selection screen 104; an area 530 for displaying and setting a stitch width of a zigzag stitch in a pattern; an area 540 for displaying and setting a stitch length of a pattern; and an area 550 for displaying and setting a tension of a pattern.

First, the pattern selection screen 104 may serve as a screen for displaying and selecting one of utility stitch patterns 103 to be formed by the sewing machine 1. The pattern selection screen 104 may appear on the screen 100 when a utility stitch key 91 is selected from a display menu displayed at an upper part of the screen 100. The display menu may include the utility stitch key 91, a character decorative stitch key 92, an embroidery key 93, and an embroidery edit key 94. The utility stitch patterns 103 displayed on the pattern selection screen 104 may be classified into categories depending on usage, such as five categories identified by category numbers 1 to 5, and the utility stitch patterns 103 may be displayed on the pattern selection screen 104 on a category-by-category basis. On the pattern selection screen 104 shown in FIG. 4, 20 utility stitch patterns 103 assigned to page 1 may be displayed from among the 36 utility stitch patterns classified in a category number 1. In this way, pages may be assigned to the utility stitch patterns 103 classified into five categories, while the utility stitch patterns displayed on the pattern selection screen 104 may be defined as one page. In addition, a category number 131, an intra-category number 132, and a stitch pattern 133 may be displayed along with each of the utility stitch patterns 103. The category number 131 may represent a name of the category into which one of the utility stitch patterns 103 is classified and represents a sequential order among the categories when the patterns are displayed on the pattern selection screen 104.

When a utility stitch pattern is selected by a user from among the utility stitch patterns 103 displayed on the pattern selection screen 104, the category number 131, the intra-category number 132, and the pattern name of the selected utility stitch pattern may be displayed on a selected pattern field 120. These items may be read out from the ROM 62, and then, may be stored in the pattern storage area 631 of the RAM 63. On the screen 100 shown in FIG. 4, "1-01 Straight stitch (left)" is displayed on the selected pattern field 120. This may represent a utility stitch pattern of a category number and intra-category number. For example, "1-01 Straight stitch (left)" may correspond to a selected utility stitch pattern of a category number 1 and an intra-category number 01, which is selected by the user, and then, is displayed on the selected pattern selection field 120. With respect to the selected utility stitch pattern, its stitch pattern may be further displayed as a selected pattern display 121. Thus, it may be easy for the user to visually grasp what kind of stitches are to be formed when the selected pattern is sewn.

In an upper part of the selected pattern display 121, a presser code 124 may be displayed that represents the presser foot 30 (refer to FIG. 1), which should be mounted for sewing the selected pattern. The user may mount the presser foot 30 suitable for sewing the selected pattern in accordance with the presser code 124. In addition, a needle setting state 125 displayed at the right side of the presser code 124 may indicate setting of a needle position when operation of the sewing machine 1 is stopped. The needle setting state 125 displayed on the screen 100 in FIG. 4 may indicate a setting that a sewing needle 29 (refer to FIG. 1) remains pierced on a work cloth when the sewing operation is stopped. In addition, an automatic reinforcement stitch key 122 displayed at a lower part of the selected pattern display 121 may serve as a key for setting an operation of automatically forming reinforcement stitches at the start and the end of sewing. Further, an automatic thread cutting key 123 may serve as a key for setting a thread cutting operation of automatically cutting an upper thread and a lower thread at the end of sewing.

In addition, a previous page key 105 and a next page key 106 may be displayed at the lower right of the pattern selection screen 104. When the utility stitch patterns 103 are assigned in the same category over a plurality of pages, the previous page key 105 may be used to display the previous page of the currently displayed page. On the other hand, the next page key 106 may be used to display the next page of the currently displayed page. Category change keys 107 to 111 displayed at a lower part of the pattern selection screen 104 may be used to display the utility stitch patterns 103 corresponding to the category numbers 1 to 5, respectively, sequentially in order from page 1. Therefore, the user may direct a page change by selecting the previous page key 105 or the next page key 106 by means of a mouse selection operation or a panel operation. In addition, selecting the category change keys 107 to 111 may change the categories to be displayed on the pattern selection screen 104, in which the utility stitch patterns 103 may be classified.

The item display areas at the lower part of the screen 100 are next to be described. A setting value 408 of a stitch width of a zigzag stitch in the selected pattern (pattern width) may be displayed in an area 530 at the lower left part of the screen 100. In general, the setting value 408 of the stitch width may be automatically set at an optimal setting defined for each pattern. The user may select adjustment keys 406 and 407 displayed in the area 530 to adjust the setting value 408 by means of a mouse selection operation or a panel operation, thereby increasing or decreasing the setting value 408 by 0.5 (mm) to a desired value. In addition, a setting value 412 of a stitch length of the selected pattern may be displayed in an area 540 at the lower center of the screen 100. The setting value 412 of the stitch length may also be automatically set at an optimal setting generally defined for each pattern. As with the area 530, the user may increase or decrease the setting value 412 by 0.1 (mm) or by 0.5 (mm), depending on a pattern, and may adjust the setting value 412 to a desired value by selecting adjustment keys 410 and 411 displayed in this area 540. An upper limit and a lower limit values of the stitch width and stitch length may be stored in the ROM 62 or the EEPROM 64 for each pattern, in the range of 0.0 mm to 7.0 mm for the stitch width and in the range of 0.0 mm to 5.0 mm for the stitch length. Then, when executing a variety of processing operations relating to the stitch width and the stitch length, their respective upper limit and lower limit values may be read out from these storage areas, and then, the read out values may be stored in the stitch width storage area 636 and the stitch length storage area 637 of the RAM 63, respectively. Thus, with respect to the selected pattern, the stitch width and stitch length of the pattern may be adjusted easily and properly as desired, making it possible to sew a pattern with desired stitches.

Similarly, a key for displaying and adjusting a setting value 417 of a thread tension of the selected pattern may be displayed in an area 550 at the lower right part of the screen 100. The setting value 417 of the tension may be generally set at an optimal tension defined for each pattern. As with the area 530 and the area 540, by selecting tension adjustment keys 415 and 416, the user may increase or decrease the setting value 417 by 0.2 to adjust the tension. The setting value 417 of the tension may be adjusted in the range of 0.0 to 9.0 that is between the upper limit and the lower limit value, which are read out from the ROM 62 or the EEPROM 64 and stored in the tension storage area 638 of the RAM 63. These settings may be stored in a storage area of the RAM 63 by selecting a memory key 127, while the stored settings may be replaced by standard settings when a reset key 126 is selected.

Referring now to FIG. 5, a description is given with respect to pages assigned with the utility stitch patterns 130 to be displayed on the pattern selection screen 104 shown in FIG. 4 and the categories and display sequential order of the utility stitch patterns assigned to the pages. The utility stitch patterns read out from the ROM 62 of the sewing machine 1 and stored in the pattern storage area 631 of the RAM 63 may be classified in advance into categories of category numbers 1 to 5, according to their usage. Further, different pages may be assigned for each category in advance, while utility stitch patterns displayed on the pattern selection screen 104 at a time are defined as one page. As shown in FIG. 5, two pages may be assigned to the utility stitch patterns classified in a category number 1, while one page is assigned to each of those classified in categories number 2-5. The display sequential order of these utility stitch patterns may be specified in accordance with a combination of a priority of display among categories represented by the category number and a priority of display of pages represented by the page number in the category. In other words, the utility stitch patterns assigned to the pages may be displayed in display sequential order of page 1 of category number 1, page 2 of category number 1, page 1 of category number 2, page 1 of category number 3, page 1 of category number 4, and page 1 of category number 5. In addition, when a process for increasing a page by 1 is carried out when page 1 of category number 5 with the last display sequential order is displayed, page 1 of category number 1 with the first display sequential order may be displayed. On the other hand, when a process for decreasing a page by 1 is carried out when page 1 of category number 1 with the first display sequential order is displayed, page 1 of category number 5 with the last display sequential order may be displayed. In this way, display change may be made in order by defining the display sequential order of the utility stitch patterns assigned to pages.

Figure 6:
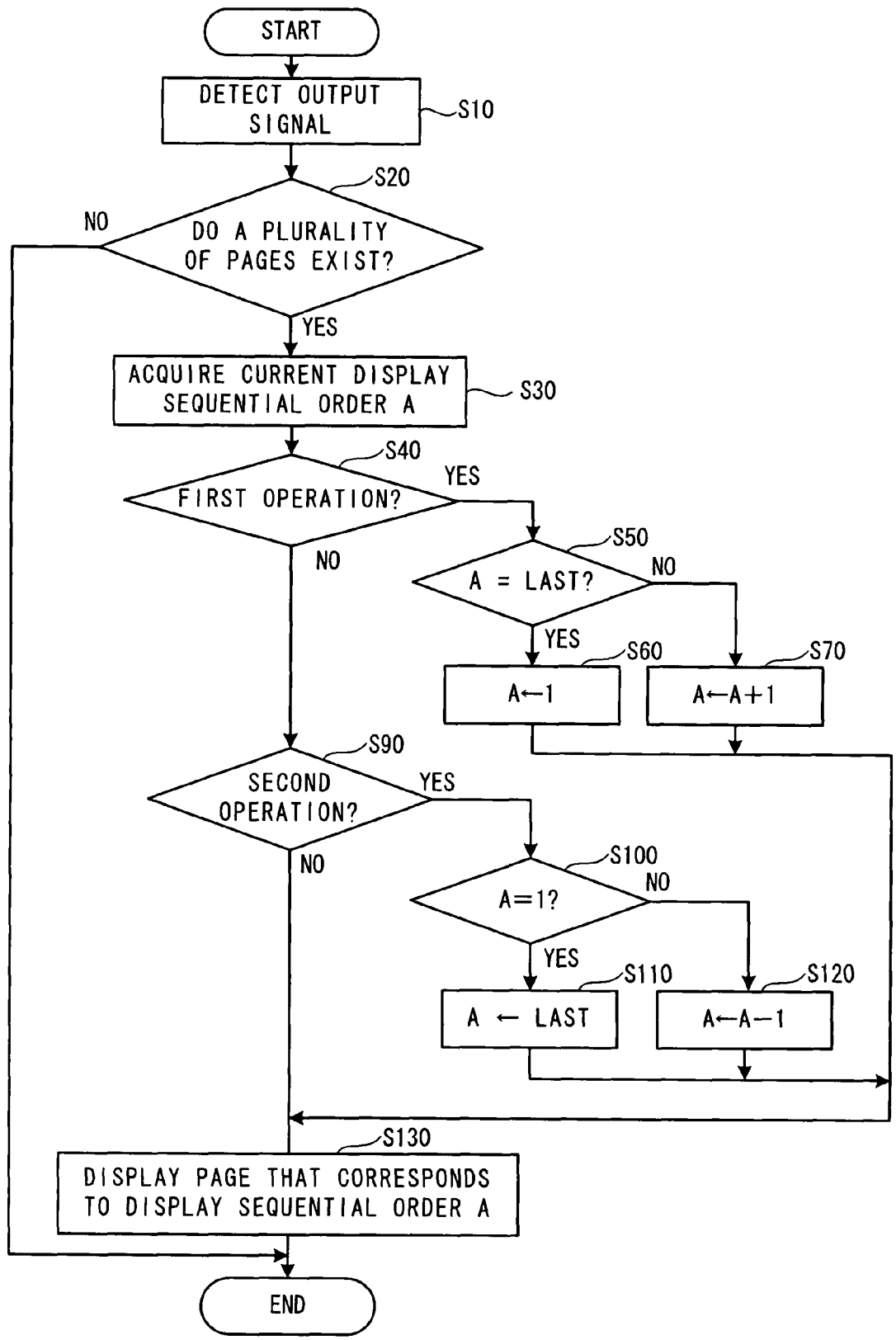
FIG. 6 is a flow chart of a page change process.

Referring next to a flowchart of a page change process shown in FIG. 6, a description is given first with respect to a process for displaying patterns assigned to a page with an increased display sequential order. In the first exemplary embodiment, an output signal, which is produced when the mouse wheel 28 is rolled forward or backward, may be associated with a page change process of the pattern selection screen 104, regardless of a display position of the cursor 140 displayed on the screen 100.

First, when the mouse wheel 28 is rolled backward (towards a user) by a user and an output signal of this operation may be outputted, an output signal based on the operation of the mouse wheel 28 may be detected, and then, this output signal may be stored in the output signal storage area 634 of the RAM 63 (S10). Next, reference may be made to the display sequential order storage area 632 of the RAM 63, and then, it may be determined whether a plurality of pages are stored in the display sequential order storage area 632 (S20). This may determine that the page change process should be terminated when a total number of pages is 1, because a page with an increased page number or a decreased page number may not be displayed. In Example 1, as shown in FIG. 5, utility stitch patterns may be assigned over six pages, and thus it may be determined that a plurality of pages are stored (S20: Yes). On the other hand, if the utility stitch patterns are assigned to only one page (S20: No), processing may be terminated.

Then, reference may be made to the display page storage area 635 storing the display sequential order of a currently displayed page, and then, 1 may be acquired as the display sequential order of the utility stitch patterns 103 assigned to category number 1 and page 1 (S30). Further, in order to determine a type of operation indicated by the output signal detected in S10, reference may be made to the output signal storage area 634 of the RAM 63, and then, it may be determined whether the type of operation is a first operation (S40). As described previously, when the mouse wheel 28 is rolled backward, the first operation may be assigned, and thus, it may determine that the type of operation of the output signal detected in S10 is the first operation (S40: Yes).

Then, reference may be made to the display sequential order storage area 632, and then, it may determine whether the display sequential order 1 (A=1) acquired in S30 is the last display sequential order (S50). In this process, when the display sequential order is the last (S50: Yes), a process for displaying a page with the first display sequential order (S60) may be carried out, instead of a process for increasing the display sequential order. In Example 1, the display sequential order 6 may be the last display sequential order and thus the display sequential order 1 is not the last (S50: No). Therefore, reference may then be made to the display page storage area 635 and the correlation storage area 633 of the RAM 63, and then, a number 2 may be obtained by increasing the display sequential order 1 (A=1) by increment 1, which is stored in the correlation storage area 633, and then may be stored in the display page storage area 635 of the RAM 63 (S70). Thereafter, reference may be made to the display page storage area 635, the display sequential order storage area 632, and the pattern storage area 631, the utility stitch patterns assigned to page 2 of the category number 1 that corresponds to the display sequential order 2 may be displayed on the pattern selection screen 104 (S130), and then, processing may be terminated. In accordance with this process, as in a screen 150 shown in FIG. 7, the previously displayed screen shown in FIG. 4 may be replaced by the pattern selection screen 104 displaying the utility stitch patterns 103 assigned to page 2 of the category number 1. In the exemplary embodiment, the page change process may be carried out by way of operating the mouse wheel 28. Therefore, even a user who is unfamiliar with the operation may easily change pages within the same category, in comparison with pointing the cursor 140 at the next page key 106 displayed on the screen in FIG. 4 and clicking a left button 37 of the mouse 27. In addition, the user may operate the mouse 27 close at hand, and there is no need for making a search for the next page key 106 displayed somewhere on the pattern selection screen 104. Therefore, even a user who is unfamiliar with operation may easily make a page change operation in comparison with changing pages by means of panel operation. In addition, in a page change process, because the previous page key 105 and the next page key 106 for changing pages are not used, thus it may be possible to reduce the display size of these keys or even to eliminate them. In other words, it may be possible to improve the degree of freedom for designing the display contents of the screen.

Figure 7:
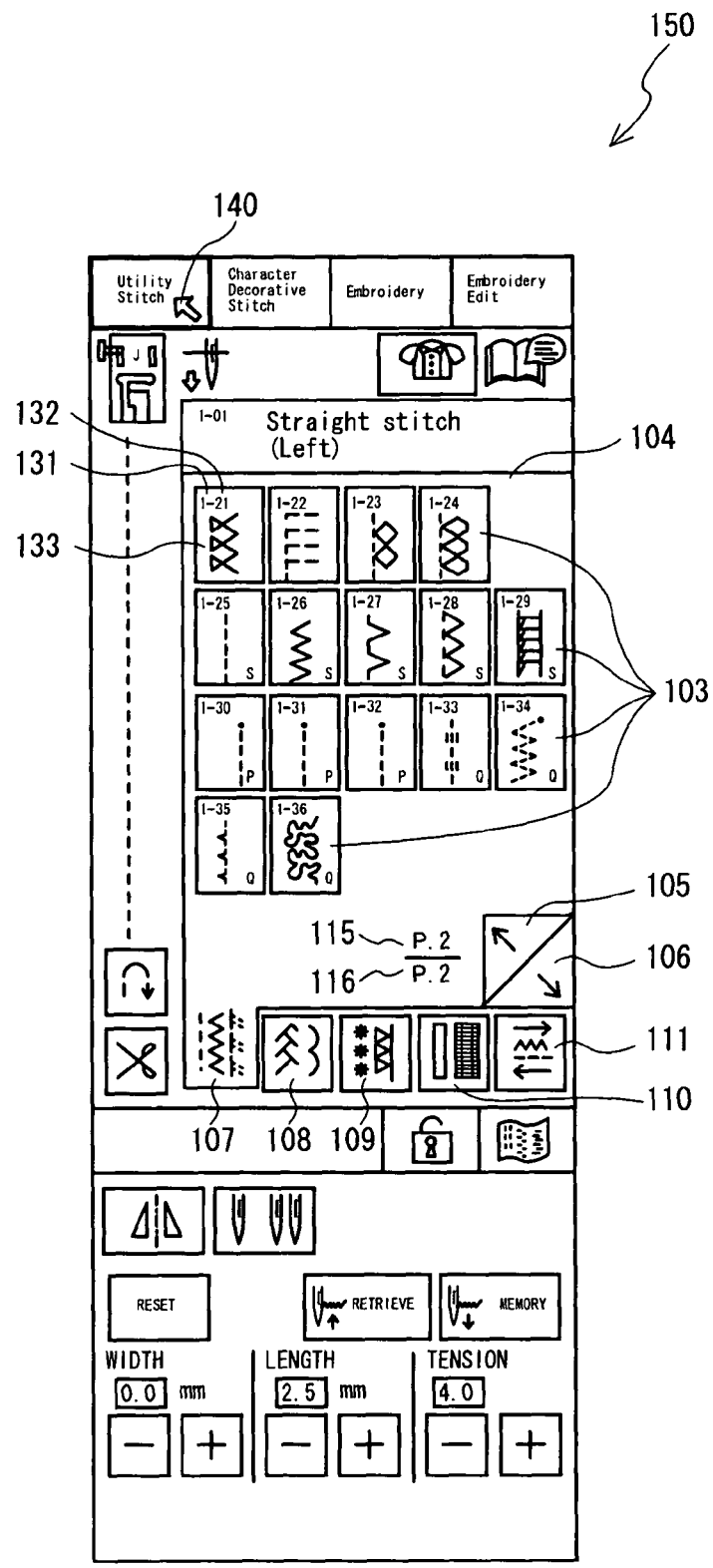
FIG. 7 is an explanatory view of a state in which utility stitch patterns are displayed on a pattern selection screen.

If the mouse wheel 28 is further rolled backward by the user while the screen 150 shown in FIG. 7 is displayed, the page change process may be executed as previously described. In this case, after processing of S50 is carried out (S50: No), a display sequential order 2 may be increased by 1 (S70). As a result, the utility stitch patterns displayed on the pattern selection screen 104 may be changed to the utility stitch patterns assigned to a category number 2 and page 1 that correspond to a display sequential order 3 (S130). In accordance with this process, as in a screen 200 shown in FIG. 8, the previously displayed screen 150 shown in FIG. 7 may be replaced by a pattern selection screen 104 displaying the utility stitch patterns assigned to page 1 of the category number 2. In this way, by operating the mouse wheel 28, it may be possible to carry out a process to change a displayed page to another page to which utility stitch patterns classified in a different category have been assigned. Therefore, operation to change a current page to another page of a different category may be easier in comparison with pointing the cursor 140 at the category change key 108 that corresponds to the category number 2 shown in FIG. 4, and then, clicking the left button 37 of the mouse 27. In addition, when pages of the display sequential orders 1 to 3 are continuously changed, an operation of rolling the mouse wheel 28 backward twice may be sufficient according to the exemplary embodiment. Therefore, operation may be more easily made in comparison with selecting different keys, that is, the next page key 106 and the category change key 108, shown in FIG. 4, by a mouse selection operation or a panel operation. In addition, in a page change process, the category change keys 107 to 111 for changing pages may not be used, thus it may be possible to reduce the size of these keys or even to eliminate them. In other words, it may be possible to improve the degree of freedom for designing the display contents of a screen.

As described above, by rolling the mouse wheel 28 of the mouse 27 backward, it may be possible to increase the display sequential order A of a page by 1, and then, sequentially change patterns displayed on the pattern selection screen 104.

Figure 8:
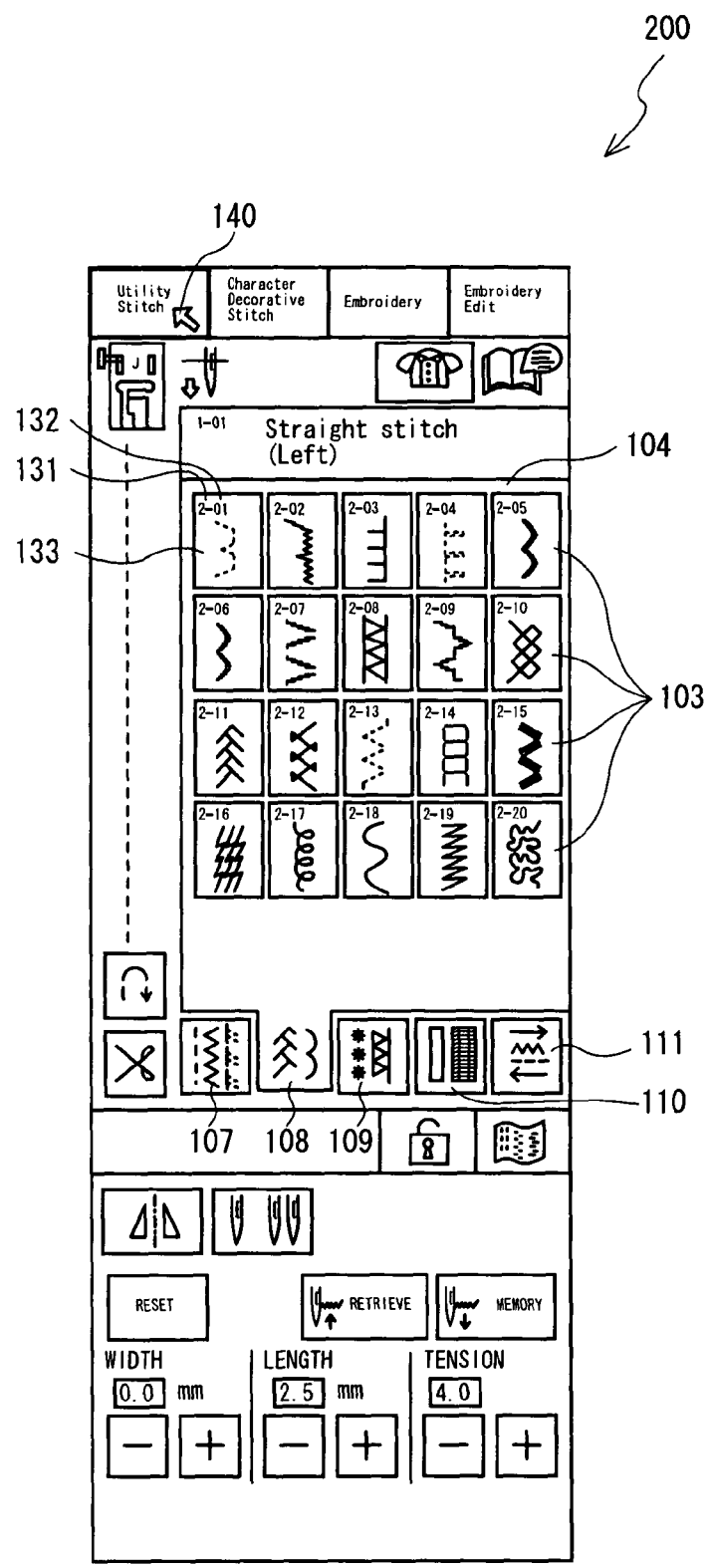
FIG. 8 is an explanatory view of a state in which other utility stitch patterns are displayed on a pattern selection screen.

Referring next to a flowchart of a page change process shown in FIG. 6, a description is given with respect to a process for displaying utility stitch patterns assigned to a page of a decreased display sequential order. First, the mouse wheel 28 may be rolled forward by a user while the screen 200 shown in FIG. 8 is displayed. As with a process for increasing a display sequential order, an output signal of this operation may be outputted, an output signal based on the operation of the mouse wheel 28 may be detected, and then, the detected signal may be stored in the output signal storage area 634 of the RAM 63 (S10). Next, it may be determined that a plurality of pages are stored in the display sequential order storage area 632 (S20: Yes), and then, the display sequential order 3 corresponding to a category number 2, page 1 stored in the display page storage area 635, may be acquired (S30). Thereafter, reference may be made to the output signal storage area 634, and then, a type of operation indicated by the output signal may be determined (S40). As described previously, when the mouse wheel 28 is rolled forward, a second operation may be assigned. Therefore, it may be determined that the type of operation detected in S10 is not the first operation (S40: No), and then, in S90 that follows, it may be determined that the type of operation detected in S10 is the second operation (S90: Yes).

Then, reference may be made to the display page storage area 635 of the RAM 63, and then, it may be determined whether the display sequential order 3 (A=3) acquired in S30 is 1 (S100). In this process, when a display sequential order A is 1, which is the first display sequential order, (S100: Yes), a process for displaying a page of the last display sequential order (S110) may be carried out, instead of a process for decreasing the display sequential order. The display sequential order 3 may be stored in the display page storage area 635 of the RAM 63 (S100: No). Accordingly, reference may then be made to the display page storage area 635 and the correlation storage area 633 of the RAM 63, and then, a number 2 may be obtained by decreasing the display sequential order 3 by a decrement 1, which is stored in the correlation storage area 633, and then stored in the display page storage area 635 of the RAM 63 (S120). Thereafter, reference may be made to the display page storage area 635, the display sequential order storage area 632, and the pattern storage area 631, the utility stitch patterns assigned to page 2 of the category number 1 that corresponds to the display sequence 2 may be displayed on the pattern selection screen 104 as shown in FIG. 7 (S130), and then, processing may then be terminated. In this way, by operating the mouse wheel 28, the utility stitch patterns displayed on the pattern selection screen 104 may be easily changed to those assigned to a different page of which categories are different from each other.

If the mouse wheel 28 is further rolled forward by the user while the screen 150 shown in FIG. 7 is displayed, a similar process may be carried out. Specifically, after the process of S100 (S100: No), the display sequential order 2 may be decreased by 1 (S120), and then, the utility stitch patterns assigned to the category number 1, page 1 that correspond to the display sequential order 1, may be displayed (S130). In accordance with this process, as in the screen 100 shown in FIG. 4, the previously displayed screen shown in FIG. 7 may be changed to a pattern selection screen 104 displaying the utility stitch patterns assigned to page 1 of the category number 1. In this way, by operating the mouse wheel 28, a current page may be easily changed to another page with a decreased display sequential order. If the mouse wheel 28 is still further rolled forward by the user while the screen 100 shown in FIG. 4 is displayed, it may be determined that a current operation is a second operation in S90 (S90: Yes). Thereafter, it is determined that the display sequential order A is 1 in S100 (S100: Yes). Then, reference may be made to the display sequential order storage area 632 in order to carry out a process for displaying a page of which display sequential order is the last, instead of a process for decreasing a display sequential order. In this case, a number 6, which is the last display sequential order, may be set at the display sequential order A and then, the setting may be stored in the display page storage area 635 (S110). Then, the utility stitch patterns assigned to a category number 5, page 1 that corresponds to the display sequential order 6 may be displayed (S130), and then, processing may be terminated. In accordance with this process, as in a screen 250 shown in FIG. 9, the previously displayed screen shown in FIG. 4 may be changed to a pattern selection screen 104 displaying the utility stitch patterns assigned to page 1 of the category number 5.

As described above, by rolling the mouse wheel 28 of the mouse 27 forward, it may be possible to decrease a display sequential order of a page, and then, to change the patterns displayed on the pattern selection screen on a one-by-one page basis.

According to the sewing machine of the first exemplary embodiment described above in detail, patterns, serving as display items to be displayed on the liquid crystal display 15, may be displayed in units of pages, and it may be possible to easily change pages by rolling the mouse wheel 28 forward or backward. Thus, operability may be improved for selecting and displaying a desired pattern from among a plurality of patterns displayed on the liquid crystal display 15. In addition, patterns may be classified into five categories based on their contents, and then, the classified patterns may be displayed on different pages for each category. Therefore, the display items of similar contents may be continuously displayed, and then, an operation of display change of patterns in order may be easily made in accordance with the display order assigned to each page. In addition, different instructions of category change and page change may be executed by means of the same operation of rolling the mouse wheel 28. Thus, operation may be more simplified and operability is more improved in comparison with carrying out them by means of separate operations. In addition, an operation device may include the mouse 27 equipped with the mouse wheel 28, a rotational element, thus facilitating a pattern change operation. Further, the user may operate the mouse 27 close at hand but distant from the liquid crystal display 15, thereby improving the degree of freedom for operation in comparison with when the operation device is fixed. Moreover, a display device may be made of a thin liquid crystal display 16 and a liquid crystal display controller 75, thus making it possible to reduce a space for installing the display device. In addition, pages may be changed without the use of a variety of selection keys for changing a display, thus making it possible to reduce the display size of these selection keys, or to eliminate the display of them. As a result, it may be possible to improve the degree of freedom for designing the display contents of the screen.

In the first exemplary embodiment described above, an output signal of the mouse wheel 28 may be assigned to a page change process for a page of a pattern selection screen 104. This method is advantageous in that pages may be changed by way of operating the mouse wheel 28 regardless of a position of the cursor 140 displayed on the screen of the liquid crystal display 15. On the other hand, when plural types of display items are displayed in different item display areas on the liquid crystal display 15, there may be case in which an attempt is made to change display items displayed in a desired item display area by operating an operation device. In such a case, a second exemplary embodiment described below may be employed.

Figure 10:
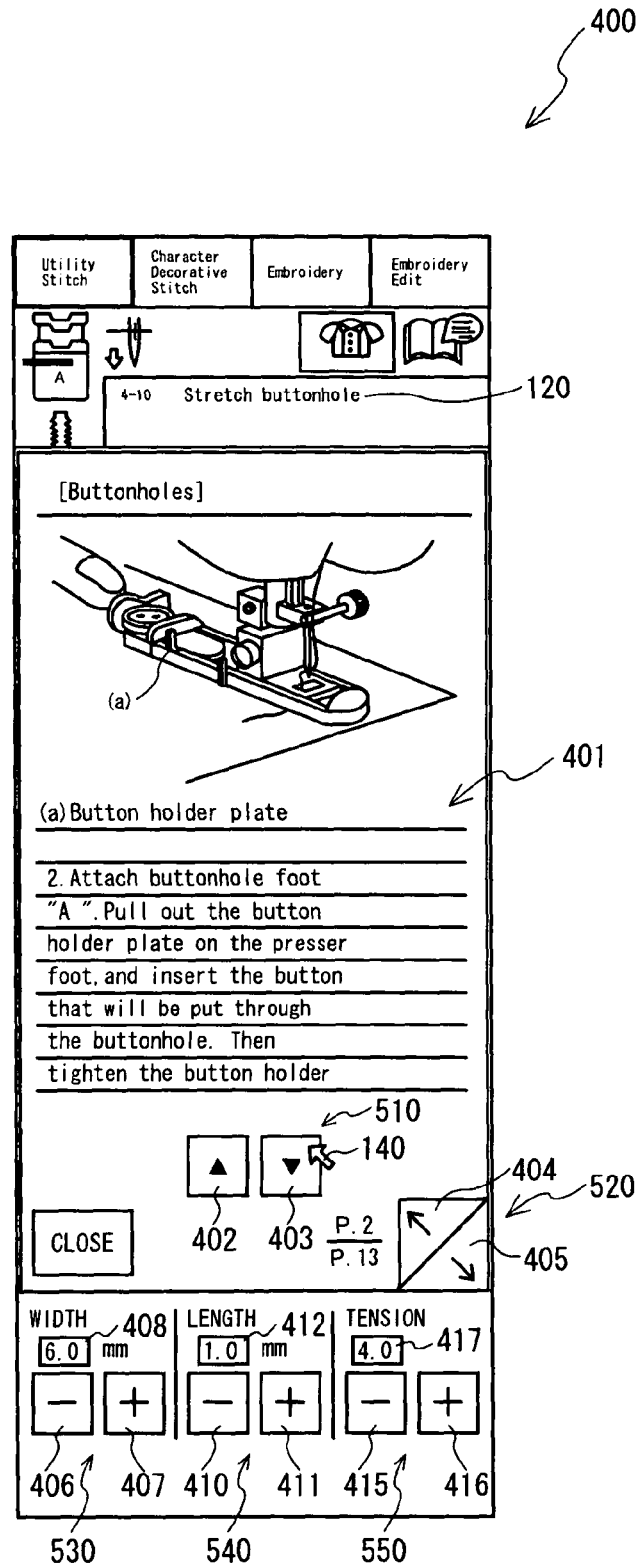
FIG. 10 is an explanatory view of a screen on which a plurality of display items are displayed in different item display areas.
Figure 11:
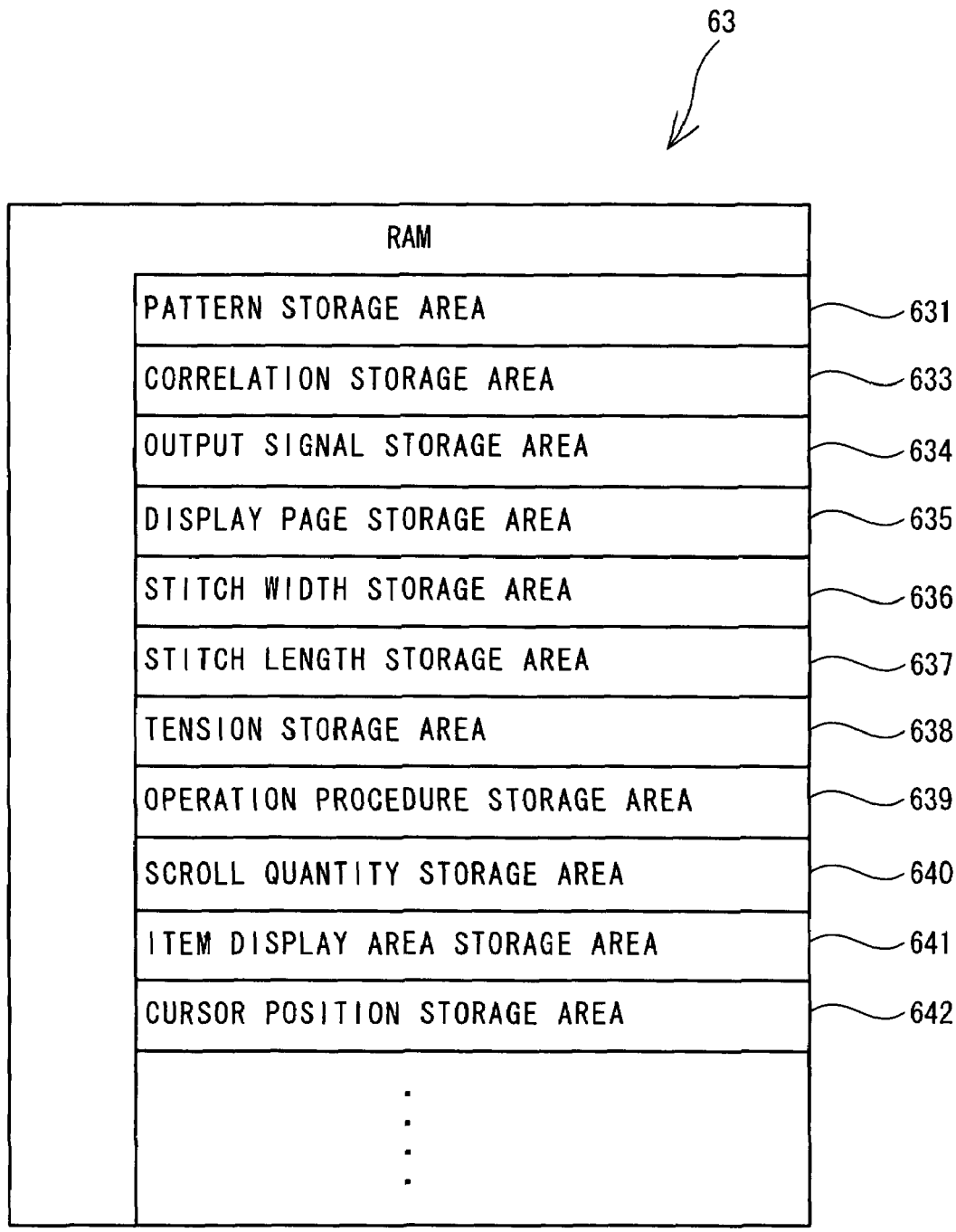
FIG. 11 is a conceptual view of a storage area of a RAM.

Referring now to FIG. 10 to FIG. 14, a description is be given below with respect to an operation of changing display items displayed on a screen 400 shown in FIG. 10 for each item display area, by using a sewing machine according to the second exemplary embodiment. A physical configuration and an electrical configuration of the sewing machine in the second exemplary embodiment are similar with exception to the storage areas of the RAM 63. Therefore, configuration similar to those of the first exemplary embodiment is not described. Referring to FIG. 11, a description is given with respect to the storage areas of the RAM 63 having a configuration that is different from that of the first embodiment.

As shown in FIG. 11, according to the second exemplary embodiment, the storage areas of the RAM 63 may include: a pattern storage area 631; a correlation storage area 633; an output signal storage area 634; a display page storage area 635; a stitch width storage area 636; a stitch length storage area 637; a tension storage area 638; an operating procedure storage area 639; a scroll quantity storage area 640; an item display area storage area 641; and a cursor position storage area 642. In the pattern storage area 631, plural types of patterns read out from the ROM 62 may be stored a category number, an intra-category number, a stitch pattern, a pattern name, a page to be displayed on a pattern selection screen of the liquid crystal display 15, and display position on the page. The correlation storage area 633 may store a correlation between an output signal from the mouse 27 with the mouse wheel 28 and change the quantity of display items. The output signal storage area 634 may store an output signal of the mouse 27 with the mouse wheel 28. The display page storage area 635 may store a display sequential order of a display page, that is, a page currently may be displayed on the liquid crystal display 15. The stitch width storage area 636 may store a stitch width of a zigzag stitch in a pattern and its upper and lower limit values for each pattern. The stitch length storage area 637 may store a stitch length of a pattern and its upper and lower limit values for each pattern. The tension storage area 638 may store a tension and its upper and lower limit values for each pattern. The operating procedure storage area 639 may store operating procedures to be displayed in an item display area 401. The scroll quantity storage area 640 may store a scroll quantity of the operating procedures displayed in the item display area 401 and the upper and lower limits of the scroll quantity. The item display area storage area 641 may store selection areas, a plurality of item display areas displayed on a screen for selection, in association with the item display areas subject to a change when any of the selection areas is selected. The cursor position storage area 642 may store a display position of the cursor 140 displayed on the liquid crystal display 15. As in the first exemplary embodiment, a variety of information required to execute a changing process according to the second embodiment may be read out from the ROM 62, the EEPROM 64, or the external storage area 39, and then, the read out information may be stored in a predetermined area of the RAM 63.

Referring now to FIG. 10, a description is given with respect to display items and item display areas displayed on the screen 400. On the screen 400, "4-10 Stretch buttonhole", which has been selected from among the utility stitch patterns, may be displayed in the selected pattern field 120. Then, in an item display area 401, operating procedures for sewing a buttonhole by a sewing machine 1 may be displayed together with illustrations. The operation for sewing a buttonhole includes a plurality of steps so that the operating procedures may be displayed over several pages that are different from each other for each step. In addition, as in the screen 400, when one step of the operating procedures is expressed in text that overflows from the item display area 401, text scroll keys 402 and 403 may be displayed in an area 510 at a lower part of the item display area 401 for scrolling and displaying the preceding or following part of the step. When the text scroll key 402 has been selected, the text of the operating procedures displayed in the item display area 401 may be fed backward (upward). When the text scroll key 403 has been selected, the text may be fed forward (downward). On the other hand, changing a page displayed in the item display area 401 to see a different step of the operating procedures may be carried out by operating a previous page key 404 or a next page key 405 displayed in an area 520 at the lower right part of the item display area 401. In FIG. 10, page 2 may be displayed on the screen 400 out of the total of 13 pages that show the operating procedures for sewing a buttonhole.

Next, a description is given with respect to areas 530, 540, and 550 that serve as item display areas at the lower part of the screen 400. The configuration of the areas 530, 540 and 550 and adjusting procedures of setting values 408, 412, and 417 may be identical to those described with reference to the screen 100 (refer to FIG. 4) in the first exemplary embodiment and thus, the description is omitted. In FIG. 10, the screen 400 may display an optimal setting value 408 of the stitch width, an optimal setting value 412 of the stitch length, and the optimal setting value 417 of the tension, respectively, when "4-10 Stretch buttonhole" has been selected as a utility stitch pattern to be sewn. In this exemplary embodiment, the stitch width storage area 636 may store an upper limit value of 7.0 mm and a lower limit value of 3.0 mm for the zigzag stitch width of this buttonhole pattern. In addition, the stitch length storage area 637 may store an upper limit value of 2.0 mm and a lower limit value of 0.5 mm for the stitch length. Further, the tension storage area 638 may store an upper limit value of 9.0 and a lower limit value of 0.0 for the tension.

Next, a description is given with respect to a correlation between a plurality of item display areas described above and a display position of the cursor 140 displayed on the screen 400. In the second exemplary embodiment, an item display area in which the display is to be changed may be specified depending on the display position of the cursor 140 on the liquid crystal display 15 when an output signal from the mouse wheel 28 is detected. The display position of the cursor 140 may be set by means of a mouse movement operation or a panel operation. A correlation between the cursor position and the item display area in which the display is to be changed may be stored in the item display area storage area 641 as described below. If the display position of the cursor 140 is in the area 510, the operating procedures displayed in the item display area 401 may be scrolled. If the display position is in the area 520, a page showing the operating procedures displayed in the item display area 401 may be changed. If the display position is in the area 530, the setting value 408 of the stitch width displayed in the area 530 may be changed. If the display position is in the area 540, the setting value 412 of the stitch length displayed in the area 540 may be changed. If the display position is in the area 550, the setting value 417 of the tension displayed in the area 550 may be changed.

Next, a description is given with respect to a relationship between an output signal of the mouse wheel 28 and a change quantity of a display item, which has been defined for each item display area of the screen 400 described above. In the second exemplary embodiment, as in the first exemplary embodiment, an operation of rolling a mouse wheel 28 backward may be defined as a first operation, while an operation of rolling the mouse wheel 28 forward may be defined as a second operation. When the display position of the cursor 140 is in the area 510, an output signal determined to be the first operation may be defined as a signal for increasing a scroll quantity by 1, while an output signal determined to be the second operation may be defined as a signal for decreasing the it by 1. When the display position of the cursor 140 is in the area 520, an output signal determined to be the first operation may be defined as a signal for increasing a display sequential order of the page by 1, while an output signal determined to be the second operation may be defined as a signal for decreasing it by 1. When the display position of the cursor 140 is in the area 530, an output signal determined to be the first operation may be defined as a signal for increasing the setting value 408 by 0.5, while an output signal determined to be the second operation may be defined as a signal for decreasing it by 0.5. In addition, when the display position of the cursor 140 is in the area 540, an output signal determined to be the first operation may be defined as a signal for increasing the setting value 412 by 0.1, while an output signal determined to be the second operation may be defined as a signal for decreasing it by 0.1. However, with respect to the setting value 412 of this stitch length, the signals may be for increasing or decreasing the setting value by 0.5, depending on a pattern type. When the display position of the cursor 140 is in the area 550, an output signal determined to be the first operation may be defined as a signal for increasing the setting value 417 by 0.2, while an output signal determined to be the second operation is defined as a signal for decreasing it by 0.2. In this way, a correlation between a type of operation of the mouse wheel 28 and an increment or decrement quantity of the display sequential order may be defined, and then, may be stored in the correlation storage area 633 of the RAM 63 for each item display area. As described previously, the movement quantity of the cursor 140 may be determined depending on movement quantity of the mouse 27 detected by the movement quantity detector portion 35. At this time, among the movement quantity of the mouse 27, the movement quantity of the mouse 27 in the Y direction may be assigned to that of the cursor 140 in the longitudinal direction of the liquid crystal display 15, while the movement quantity of the mouse 27 in the X direction may be assigned to that of the cursor 140 in the transverse direction of the liquid crystal display 15. In addition, a movement ratio relative to the movement quantity in the Y direction may be set to be twice of that relative to the movement quantity in the X direction. Thus, an operation quantity of the mouse 27 for moving the cursor 140 by a predetermined quantity C in the longitudinal direction of the liquid crystal display 15 may be smaller in comparison with moving the cursor 140 by the same quantity C in the transverse direction of the liquid crystal display 15. Therefore, operability for moving the cursor 140 may be improved.

Next, a description is given with respect to a process for changing display items displayed in a desired item display area by operating the mouse wheel 28 when plural types of display items are displayed in various item display areas on the liquid crystal display 15.

First, a process for scrolling the display of the operating procedures displayed in the item display area 401 is described with reference to a main flowchart shown in FIG. 12 and a subsidiary flowchart shown in FIG. 13. First, as shown in FIG. 10, the display position of the cursor 140 on the screen 400 may be set in the area 510 by means of a mouse movement operation or a panel operation, and then, the mouse wheel 28 may be rolled backward. Then, an output signal outputted from the mouse wheel 28 may be detected, and then the detected output signal may be stored in the output signal storage area 634 of the RAM 63 (S510). Subsequently, reference may be made to the cursor position storage area 642 of the RAM 63, which stores coordinates of the position of the cursor 140, and then, it may be determined whether the cursor 140 exists in the area 510 (S520). This process may serve for determining in which area a position is set of the cursor 140 displayed on a screen 400, and then specifying an item display area in which a display item is to be changed. As shown in FIG. 10, the cursor 140 may be set in the area 510 by the user (S520: Yes). Therefore, reference is made to the item display area storage area 641, and thus a signal detected in S510 shown in FIG. 12 may be determined to be an output signal for scrolling the operating procedures displayed in the item display area 401. Then, a scroll type process for scrolling the operating procedures displayed in the item display area 401 may be carried out (S525).

This scroll type process is described with reference to a subsidiary flowchart of FIG. 13. FIG. 13 shows a state of a scroll quantity 1, in which a first line of the text of the operating procedures is displayed on the screen 400. Every time the scroll quantity is increased by 1, the text may be scrolled by one line. Also a maximum value of a scroll quantity of the operating procedures displayed in the item display area 401 may be defined as 5. This information may be stored in the scroll quantity storage area 640.

Figure 12:
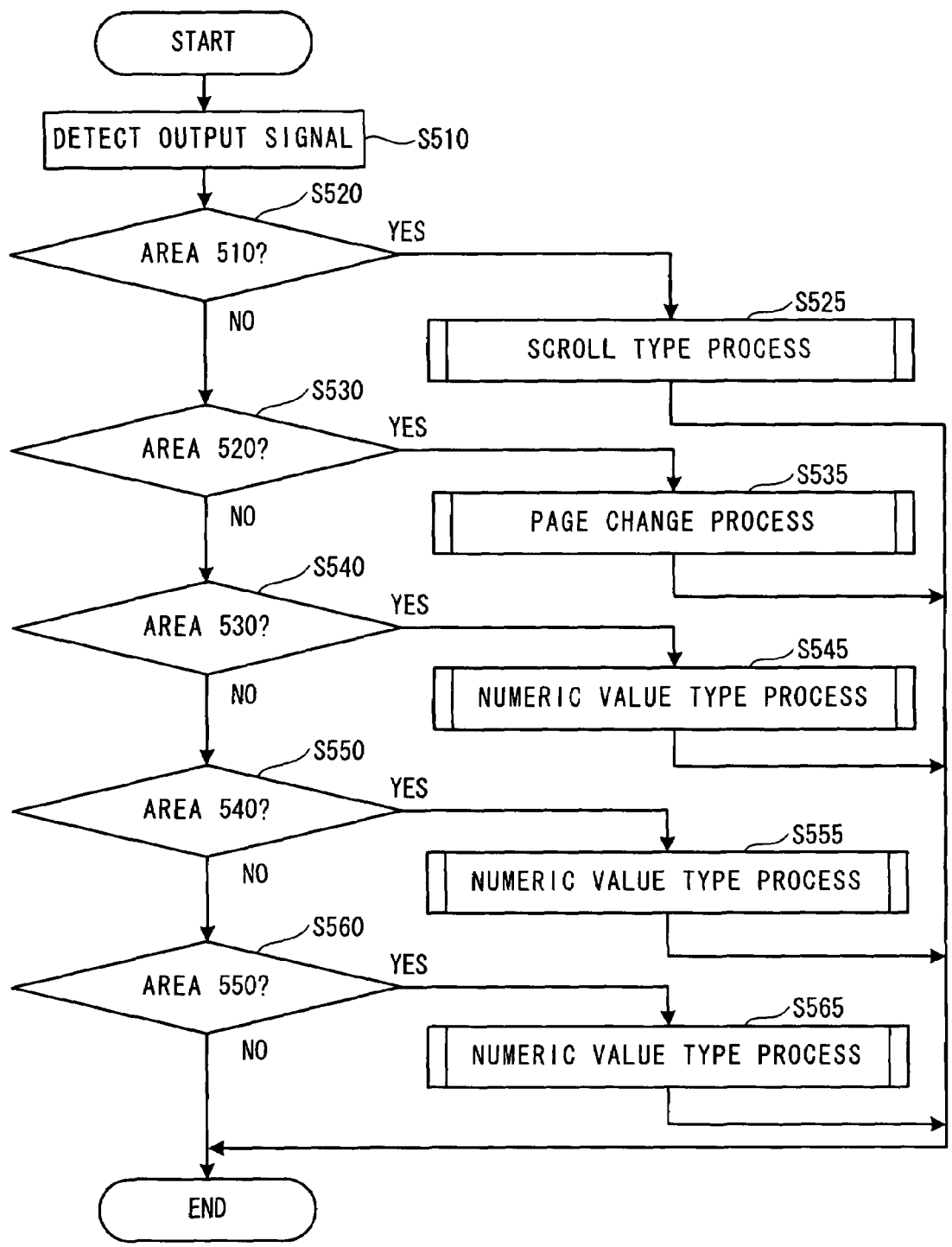
FIG. 12 is a main flowchart showing procedures for main processing.
Figure 13:
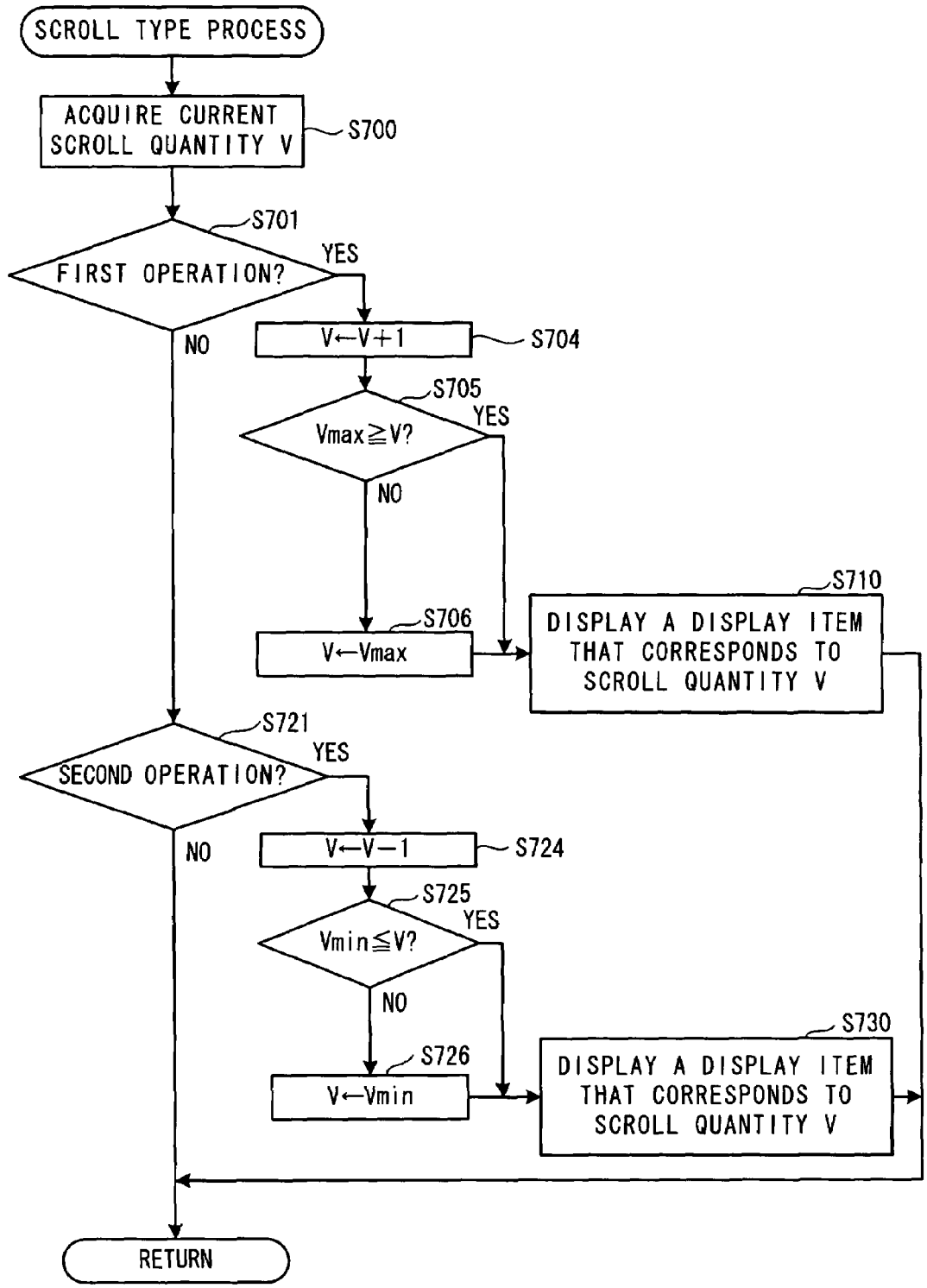
FIG. 13 is a flowchart showing procedures for scroll type processing executed in the main processing shown in FIG. 12.

First, in the scroll type process shown in FIG. 13, reference may be made to the scroll quantity storage area 640 of the RAM 63, and then, a current scroll quantity 1 may be acquired (S700). Subsequently, in order to determine a type of operation of the output signal detected in S510 shown in FIG. 12, reference may be made to the output signal storage area 634 of the RAM 63, and then, it may be determined whether the type of operation indicated by the output signal is a first operation (S701). As described previously, when the mouse wheel is rolled backward, a first operation may be assigned, and thus, it may be determined that the type of operation detected in S700 is the first operation (S701: Yes).

Then, reference may be made to the correlation storage area 633 of the RAM 63, and then, a number 2 may be obtained by increasing a current scroll quantity 1 (V=1) by an increment 1, which is stored in the correlation storage area 633, and the obtained number 2 may be stored in the scroll quantity storage area 640 of the RAM 63 (S704). Subsequently, reference may be made to the scroll quantity storage area 640, and then, it may be determined whether the scroll quantity 2 increased by 1 in S704 is equal to or smaller than 5, which is a maximum value (Vmax) (S705). This may be for setting a scroll quantity V to a maximum value (Vmax) (S706) if the scroll quantity V is larger than the maximum value (Vmax), because the scroll quantity V may not increase any more. Here, the scroll quantity increased by 1 in S704 may be 2, which is equal to or smaller than the maximum value 5 (S705: Yes). Therefore, reference may be then made to the scroll quantity storage area 640 and the operating procedure storage area 639, and then, the operating procedures corresponding to the scroll quantity 2 may be displayed in the item display area 401 (S710). In this manner, by operating the mouse wheel 28, the operating procedures displayed in the item display area 401 may be scrolled. Then, the process may return to the main process shown in FIG. 12, and then, the main process may be terminated.

Next, a description is given when the display position of the cursor 140 of the screen 400 may be set in the area 510 by a user, while the operating procedures corresponding to a scroll quantity 2 is displayed, and then, the mouse wheel 28 may be rolled forward. In this case, the process in S700 of FIG. 13 may be carried out as when the mouse wheel 28 has been rolled backward, and then, it may be determined that the output signal this time corresponds to a second operation (S701: No, and S721: Yes). Subsequently, reference may be made to the correlation storage area 633 of the RAM 63, and then, a number 1 may be obtained by decreasing the current scroll quantity 2 (V=2) by a decrement 1, which is stored in the correlation storage area 633, and then the obtained number 1 may be stored in the scroll quantity storage area 640 of the RAM 63 (S724). Subsequently, it may be determined whether the scroll quantity 1 obtained in S724 is equal to or greater than a minimum value (Vmin) (S725). This may be for setting the scroll quantity V to the minimum value (Vmin) (S726) if the scroll quantity V is smaller than the minimum value (Vmin), because the scroll quantity V may not be decreased any more in that case. The scroll quantity decreased by 1 in S724 may be now 1, which is equal to or greater than a minimum value (S725: Yes). Therefore, reference may be then made to the scroll quantity storage area 640 and the operating procedures storage area 639, and then, the operating procedures corresponding to the scroll quantity 1 may be displayed in the item display area 401 (S730). In this way, by operating the mouse wheel 28, the operating procedures displayed in the item display area 401 may be scrolled. Subsequently, the process may go back to the main process shown in FIG. 12, and then, the main process may be terminated.

Referring next to the main flowchart shown in FIG. 12, a description is given to a process for changing a page displayed in the item display area 401. As described previously, a total of 13 pages, i.e., pages 1 to 13, may be displayed in the item display area 401, in sequential order. First, the display position of the cursor 140 of the screen 400 may be set in the area 520 by a user. When a mouse wheel 28 is rolled backward, an output signal output from the mouse wheel 28 may be detected, and then, the detected output signal may be stored in the output signal storage area 634 of the RAM 63 (S510). Subsequently, reference may be made to the cursor position storage area 642 of the RAM 63, which stores coordinates of the cursor 140, and then, it may be determined that the cursor 140 exists in the area 520 (S520: No, and S530: Yes). Therefore, reference may be made to the item display area storage area 641, and then, the output signal detected in S510 may be determined to be an output signal for changing the page of the operating procedures displayed in the item display area 401. Subsequently, the page change process may be carried out to change the display page from page 2 currently displayed in the item display area 401 to page 3, by increasing the page number by 1 (S535). Because this page change process is similar to that shown in FIG. 6 of the first exemplary embodiment, the description is omitted here. By means of this process of S535, a page change process of the item display area 401 selected depending on the display position of the cursor 140 may be selectively executed.

Figure 14:
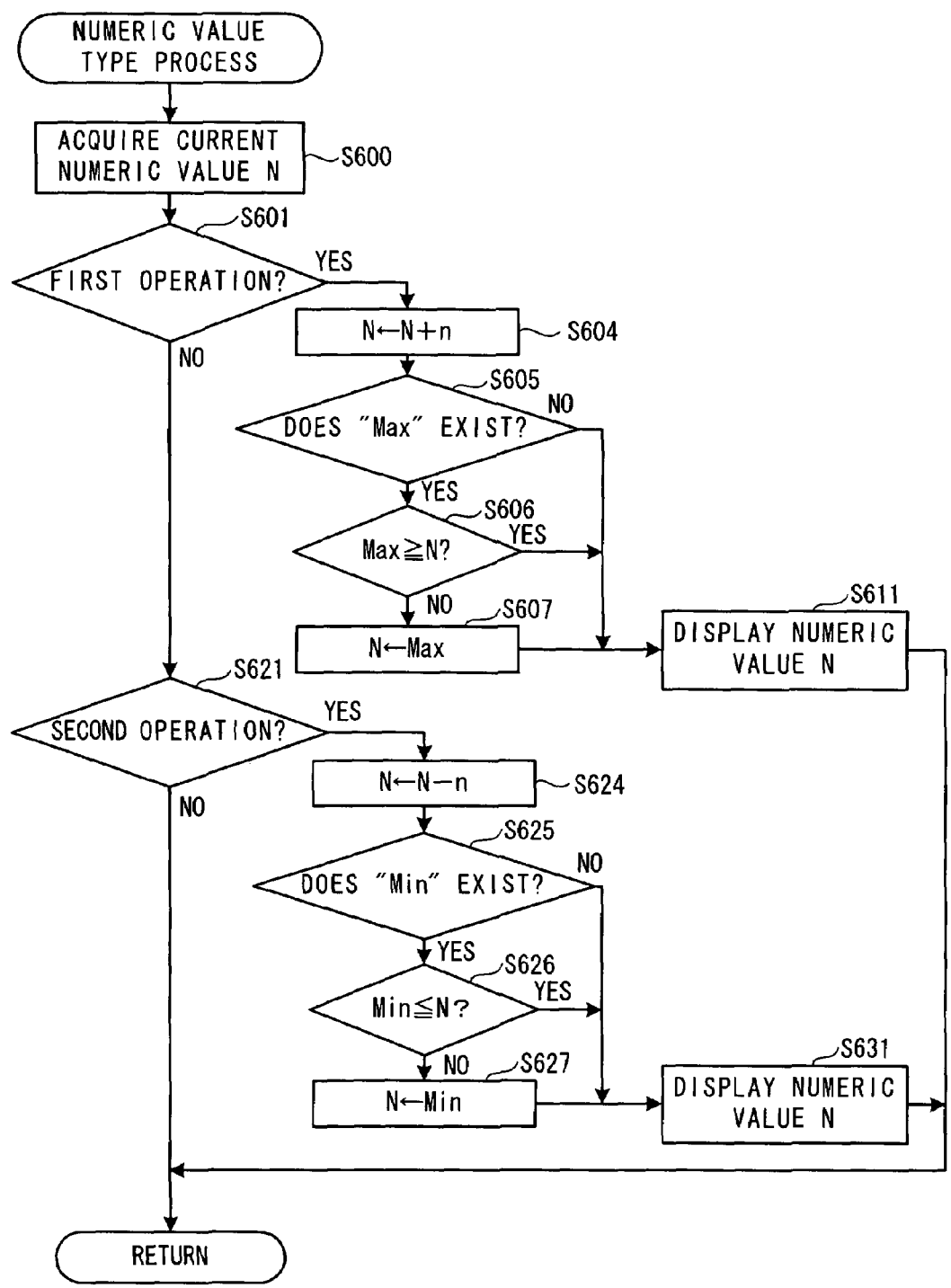
FIG. 14 is a flowchart showing procedures for numeric value type processing executed in the main processing shown in FIG. 12.

Referring next to a main flowchart shown in FIG. 12 and a subsidiary flowchart shown in FIG. 14, a description is given to a process for changing the display of the setting value 408 of the zigzag stitch width in the area 530 by increasing or decreasing it by 0.5. First, the display position of the cursor 140 of the screen 400 may be set in the area 530 by a user, and then, the mouse wheel 28 may be rolled backward. Then, an output signal outputted from the mouse wheel 28 may be detected, and then, the detected output signal may be stored in the output signal storage area 634 of a RAM 63 (S510). Then, reference may be made to the cursor position storage area 642, and then, it may be determined that the cursor 140 exists in the area 530 (S520; No, S530; Yes). Subsequently, reference may be made to the item display area storage area 641, the output signal detected in S510 may be determined to be an output signal for increasing or decreasing a numeric value displayed as setting value 408, and a numeric value type process is carried out (S545).

This numeric value type process is described with reference to FIG. 14. First, reference may be made to the stitch width storage area 636 of the RAM 63, and then, a numeric value N indicating a currently set stitch width may be acquired (S600). As shown in the setting value 408 of FIG. 10, the stitch width may be currently set at 6.0 mm, and thus, 6.0 may be acquired. Therefore, in order to determine the type of operation of the output signal detected in S510 shown in FIG. 12, reference may be made to the output signal storage area 634 of the RAM 63, and then, the output signal produced by rolling the mouse wheel 28 backward may be determined to be an output signal of a first operation (601: Yes).

Then, reference may be made to the correlation storage area 633 of the RAM 63, and then, the numeric value 6.5 may be obtained by increasing the numeric value 6.0 by an increment n=0.5, which is stored in the correlation storage area 633, and then stored in the stitch width storage area 636 (S604). Then, reference may be made to the stitch width storage area 636, and then, it may be determined whether an upper limit value (Max) is set for the numeric value N displayed as the setting value 408 (S605). This may be for displaying a numeric value equal to or smaller than the upper limit value (Max) (S606 and S607) if the upper limit value (Max) is set for the numeric value N displayed as the setting value 408 (S605: Yes). When the upper limit value (Max) is not set for the numeric value N displayed as the setting value 408 (S605: No), the numeric value N increased by 0.5 in S604 may be displayed as the setting value 408 (S611). In the exemplary embodiment, as described previously, the upper limit of the stitch width may have been set according to a pattern (S605: Yes). Subsequently, it may be determined that the numeric value 6.5 increased by 0.5 in S604 is equal to or smaller than the upper limit (S606). The numeric value increased by 0.5 in S604 may be 6.5, and thus it may equal to or smaller than the upper limit value 7.0 (S606: Yes). Thus, reference may then made to the stitch width storage area 636, and then, the numeric value 6.5 may be displayed as the setting value 408 (S611). In this manner, by operating the mouse wheel 28, the numeric value displayed as the setting value 408 in the area 530 selected by means of the cursor 140 may be increased. Then, the process may go back to the main process shown in FIG. 12, and then, the main process may be terminated. When the numeric value N exceeds the upper limit value (Max) (S606: No), the upper limit value (Max) may set for the numeric value N, and then, the set value may be displayed as the setting value 408.

Next, a description is given when, as in the example described previously, the numeric value 6.5 has been displayed as the setting value 408, the display position of the cursor 140 on the screen 400 may be set in the area 530 by the user, a mouse wheel 28 may be rolled forward. In this case, when the mouse wheel 28 has been rolled backward, the processing of S600 shown in FIG. 14 may be carried out, and then an output signal may be determined to correspond to a second operation (S601: No, and S621: Yes). Therefore, reference may be then made to the correlation storage area 633, and then, a numeric value 6.0 may be obtained by decreasing the numeric value 6.5 by a decrement of n=0.5, which is stored in the correlation storage area 633, and obtained value 6.0 may be stored in the stitch width storage area 636 (S624). Then, it is determined whether a lower limit value (Min) may be set for a numeric value N displayed as setting value 408 (S625). This may be for displaying a numeric value equal to or greater than the lower limit value (Min) (S626, S627), if the lower value (Min) is set for the numeric value displayed as the setting value 408 (S625: Yes). If the lower value (Min) is not set (S625: No), a numeric value decreased by 0.5 in S624 is displayed as the setting value 408 (S631). In the exemplary embodiment, as described previously, the lower limit value of the stitch width may be set according to a pattern (S625: Yes), and then, it may be determined whether the numeric value 6.0, obtained by decreasing the value 6.5 by 0.5 in S624, is equal to or greater than the lower limit value (S626). This may be for setting the numeric value N to the lower limit (S627) if it is smaller than the lower limit value (S626: No). In S624, the numeric value 6.0 has been obtained after decrement by 0.5, and thus, may be equal to or greater than the lower limit value of 3.0 (S626: Yes). Subsequently, reference may be made to the stitch width storage area 636, and then, the numeric value 6.0 may be displayed as the setting value 408 (S631). In this way, by operating the mouse wheel 28, the numeric value displayed as the setting value 408 selected by means of the cursor 140 may be decreased. Then, the process may return to the main process shown in FIG. 12, and then, the main process may be terminated.

When the display position of the cursor 140 is set in the area 540 by means of a similar process, if the mouse wheel 28 is rolled backward, the setting value of the stitch length displayed as the setting value 412 may be changed to an increased value by n=0.1. On the other hand, by rolling the mouse wheel 28 forward similarly, the display of the setting value may be changed to a decreased value by n=0.1 (S510 and S550: Yes and S555). In addition, when the display position of the cursor 140 is set in the area 550, if the mouse wheel 28 may be rolled backward, the setting value of the tension displayed as the setting value 417 may be changed to an increased value by n=0.2. On the other hand, if the mouse wheel 28 is rolled forward similarly, the setting value may be changed to a decreased value by n=0.2 (S510 and S560: Yes, and S565).

Figure 9:
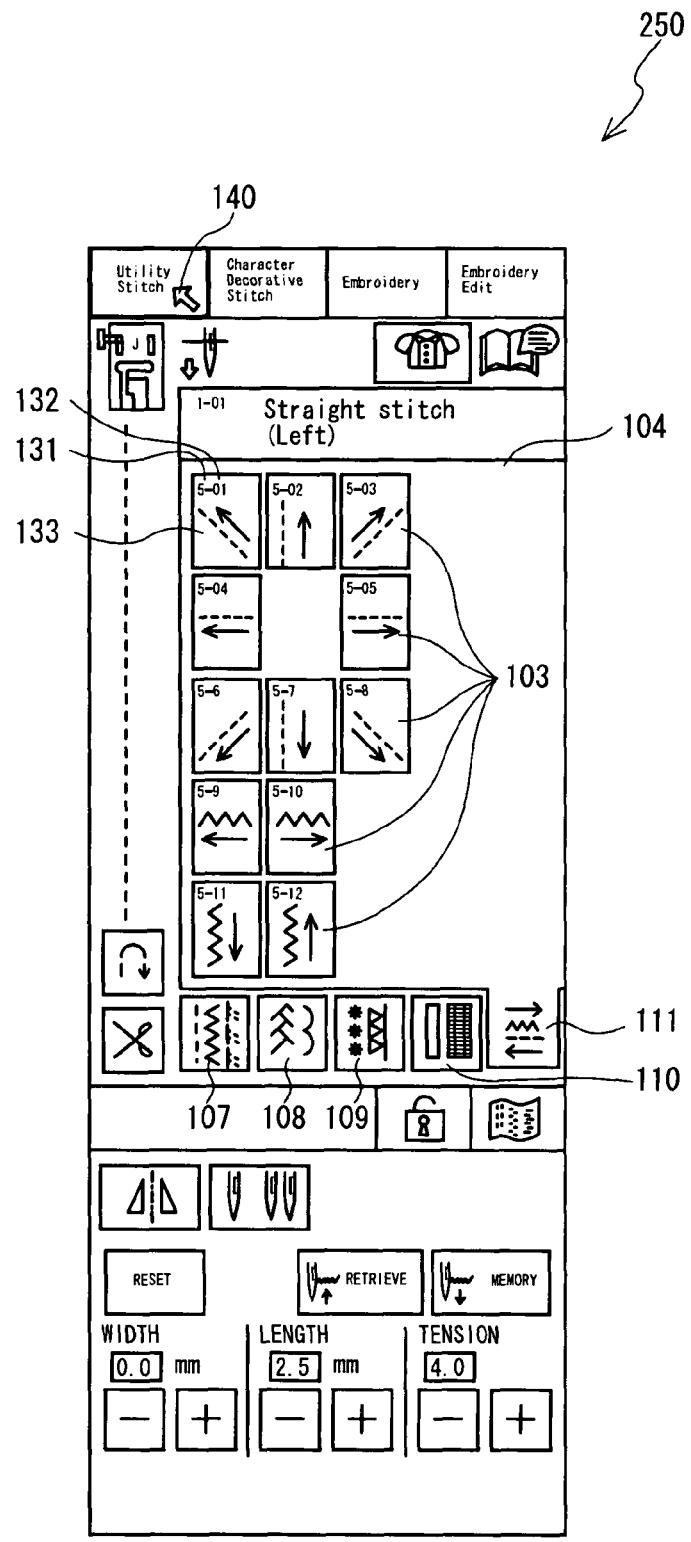
FIG. 9 is an explanatory view of a state in which other utility stitch patterns are displayed on a pattern selection screen.

According to the second exemplary embodiment described above in detail, as in the screen 400 shown in FIG. 9, when a plurality of display items are displayed simultaneously on the liquid crystal display 15, an item display area, in which a desired display item is to be displayed, is selected from among the plurality of item display areas of the screen 400, and then, the mouse wheel 28 may be operated, whereby the display item may be selectively changed. In addition, the item display area displayed on the liquid crystal display 15 may be selected by setting the display position of the cursor 140 so that a change operation may be made according to the display item of the selected item display area.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, the above-described exemplary embodiments are not limited to illustrated patterns, operating procedures and illustrations, and a variety of setting values (numeric values displayed in areas 530, 540, and 550), for carrying out the sewing by the sewing machine 1, as the display items to be displayed on the liquid crystal display 15. For example, a variety of items to be displayed on the liquid crystal display 15 may be defined as display items. In addition, when a plurality of display items are displayed on the liquid crystal display 15 serving as a display device, it may be possible to change types of display items and their combination as desired. For example, only a type of one of the display items, i.e., a numeric value type or scroll type described in the second embodiment, may be displayed.

The exemplary embodiments are also not limited to the liquid crystal display 15 as the display device. For example, another known or later-developed display device, a plasma display, may be employed.

The exemplary embodiments are not limited to a mouse 27 equipped with a mouse wheel 28 as an operation device. Any operation device with an interface capable of outputting at least one of plural types and quantity of operation as an output signal may be employed. For example, a variety of switches, a trackball, or a joystick, such as a game controller or the like, to which a first operation and a second operation have been assigned, may be employed. In addition, as the operation quantity outputted from the operation device, there may be employed at least one of operation count, operation time, and movement quantity of an operating member, depending on the operation device. For example, when a game controller is used as an operation device, the number of times when a button, to which the first operation has been assigned, is depressed may be defined as an operation quantity. In this case, every time this button is depressed, pages may be increased by 1.

The exemplary embodiments, a mouse 27, which is equipped with a mouse wheel 28, and a touch panel 26 may be used to select an item display area. However, an item display area may also be selected by means of either the mouse 27 or the touch panel 26, or by means of a variety of switches, a trackball, a joystick such as a game controller, or the like may be employed. In addition, when the mouse wheel 28 is equipped with a button, which may be depressed rightward or leftward, signals outputted from these buttons may be assigned to direction for moving the display position of the cursor 140.

In the exemplary embodiments, the mouse 27 equipped with the mouse wheel 28 may be used to move the cursor 140 displayed on the liquid crystal display 15. However, other devices may be employed as long as movement of the display position of the cursor 140 on the liquid crystal display 15 may be directed. For example, in addition to a mouse that is not equipped with the mouse wheel 28, a variety of switches, a trackball, a joystick, or the like, may be employed.

In the exemplary embodiments, the first operation may be assigned to the operation of rolling the mouse wheel 28 backward and the second operation may be assigned to the operation of rolling the mouse wheel forward so as to change a display item according to its operation quantity. However, the display items may be changed according to at least one of a type of operation and an operation quantity. Therefore, for example, when a display item is changed according to only the type of operation of the mouse wheel, the first operation may be assigned to an increase of a predetermined quantity and the second operation may be assigned to a decrease of a predetermined quantity. In addition, for example, when a display item is changed according to only the operation quantity of the mouse wheel, a correlation between an output signal and a quantity of changing the display item may be defined, such as "changing one page every time the mouse wheel is rolled by 15 degrees". Further, in when a display item is changed according to only the operation quantity of a button with the use of a game controller as an operation device, an increase and a decrease may be associated with operation quantity of the button. For example, when the operation quantity is detected as 1, the display sequential order may be increased by 1. On the other hand, when the operation quantity is 2, the display sequentially order may be decreased by 1.

The exemplary embodiments are not limited to assigning the first operation to the operation of rolling the mouse wheel 28 backward and assigning the second operation the operation of rolling the mouse wheel forward, respectively. For example, the second operation may be assigned to the operation of rolling the mouse wheel backward, while the first operation may be assigned to the operation of rolling the mouse wheel forward without being limited thereto.

In the page change process of the first exemplary embodiment, the backward rolling may be assigned to increase the display sequential order by 1 and the forward rolling may be assigned to decrease the display sequential order by 1, for any of the rotation quantities. In other words, with respect to an output signal of the mouse wheel 28, a correlation between a type and quantity of operation of the mouse wheel 28, and a change quantity of a display item may be defined. However, for example, when the mouse wheel 28 is operated by 15 degrees, the change quantity of display items may be changed in response to the rotation quantity of the mouse wheel 28 such as increasing or decreasing by one page. Further, for example, in the first exemplary embodiment, although absolute values of an increment and a decrement of a page corresponding to the first and second operations have been equally set, the values different from each other depending on the first and second operations may be set with respect to the change quantity of the display items.

Although, in the first exemplary embodiment, patterns serving as display items may be classified into a plurality of categories according to usage, the display items may not be classified into categories. In addition, in the case where the display items are classified into categories, its classification criteria may be properly set depending on the display items. Further, one display item may be classified into a plurality of categories. Also, in the first exemplary embodiment, although different pages may be assigned for each category, the display items of the categories different from each other may be assigned to the same page.

Although, in the first exemplary embodiment, patterns serving as display items may be changed by one page by operating an operation device, the mouse 27 with the mouse wheel 28, the patterns may be changed by a predetermined quantity without being limited thereto. In this case, with respect to a relationship between an operation quantity indicated by an output signal and the number of display items to be changed, an arbitrary number may be employed. In addition, the number or layout of display items assigned to each page may be changed without being limited to the aspect of the first embodiment.

In the first exemplary embodiment, patterns as display items may be assigned to pages and the layout of the pages and stored in the pattern storage area 631. Alternatively, for example, page assignment or intra-page layout may be determined every display change in accordance with category numbers or intra-category numbers.

What is claimed is:

1. A sewing machine comprising:
   a display device that displays a variety of information related to sewing;
   a display item storage device that stores display items to be displayed on the display device;
   an operation device that includes an operating member for performing plural types of operations, the plural types of operations including a first operation and a second operation, the second operation being different from the first operation, the operation device outputting as an output signal at least one of an operation type and an operation quantity in accordance with an operation of the operating member; and
   a display control device that changes a display item displayed on the display device in response to at least one of the operation type or the operation quantity outputted by the operation device, wherein:
   the display item storage device stores the display items and display sequential order of the display items in association with each other, and
   the display control device includes:
      an operation type detection device that detects the operation type included in the output signal outputted from the operation device; and
      a first display change device that increases or decreases the display sequential order based on the first operation or the second operation detected by the operation type detection device, assigning the first operation or the second operation to an increase or a decrease of the display sequential order, and that changes the display item displayed on the display device to another display item corresponding to the display sequential order.

2. A sewing machine comprising:
   a display device that displays a variety of information related to sewing;
   a display item storage device that stores display items to be displayed on the display device;
   an operation device that includes an operating member for performing plural types of operations, the plural types of operations including a first operation and a second operation, the second operation being different from the first operation, the operation device outputting as an output signal at least one of an operation type and an operation quantity in accordance with an operation of the operating member; and
   a display control device that changes a display item displayed on the display device in response to at least one of the operation type or the operation quantity outputted by the operation device, wherein:
   the display item storage device stores the display items and display sequential order of the display items in association with each other, and
   the display control device includes:
      an operation quantity detection device that detects the operation quantity of the first operation or the second operation included in the output signal outputted from the operation device, and
      a second display change device that increases or decreases the display sequential order based on the operation quantity of the first operation or the second operation detected by the operation quantity detection device, assigning the operation quantity to a quantity of an increase or a decrease of the display sequential order, and that changes the display item displayed on the display device to another display item corresponding to the display sequential order.

3. The sewing machine as claimed in claim 1, wherein the display control device further includes:
   an operation quantity detection device that detects the operation quantity of the first operation or the second operation included in the output signal outputted from the operation device; and
   a second display change device that increases or decreases the display sequential order based on the operation quantity of the first operation or the second operation detected by the operation quantity detection device, assigning the operation quantity to a quantity of an increase or a decrease of the display sequential order, and that changes the display item displayed on the display device to another display item corresponding to the display sequential order.

4. The sewing machine as claimed in claim 1, further comprising:
   a page assignment device that sequentially assigns pages to the display items so that the display item displayed in an item display area is defined as one page, the item display area being a display area covering at least a part of the display device,
   wherein the first display change device displays the display item in the item display area page by page, the page being assigned by the page assignment device, increases or decreases the display sequential order of the page, and then, changes the display item displayed in the item display area to another display item assigned to the page that corresponds to the display sequential order.

5. The sewing machine as claimed in claim 2, further comprising:
   a page assignment device that sequentially assigns pages to the display items so that the display item displayed in an item display area is defined as one page, the item display area being a display area covering at least a part of the display device,
   wherein the second display change device displays the display item in the item display area page by page, the page being assigned by the page assignment device, increases or decreases the display sequential order of the page, and then, changes the display item displayed in the item display area to another display item assigned to the page that corresponds to the display sequential order.

6. The sewing machine as claimed in claim 4, wherein:
   the display item storage device stores the display items, categories classified in accordance with contents of the display items, and the display sequential order assigned so that the display items classified in the same category are continuous, and
   the page assignment device assigns the different pages to the display items of the different categories.

7. The sewing machine as claimed in claim 5, wherein:
   the display item storage device stores the display items, categories classified in accordance with contents of the display items, and the display sequential order assigned so that the display items classified in the same category are continuous, and
   the page assignment device assigns the different pages to the display items of the different categories.

8. The sewing machine as claimed in claim 1, further comprising:
   an area selection device that selects one of item display areas, the item display areas being a plurality of display areas provided in the display device, wherein the display control device changes the display item displayed in the item display area selected by the area selection device.

9. The sewing machine as claimed in claim 1, further comprising:
an area selection device that selects one of item display areas, the item display areas being a plurality of display areas provided in the display device;
a type storage device that stores types of the display items and the item display area in which the display item is to be displayed in association with each other, the types of the display items including at least a numeric value type of which each display item is a numeric value and a scroll type of which the each display item is to be scrolled; and
a type determination device that determines the type of the display item displayed in the item display area selected by the area selection device, referring to the type storage device,
wherein if the type of the display item is determined to be the numeric value type by the type determination device, the first display change device increases or decreases the numeric value taken as the display sequential order, and then changes the numeric value defined as the display item displayed on the item display area selected by the area selection device to the increased or decreased numeric value, and, if the type of the display item is determined to be the scroll type by the type determination device, the first display change device increases or decreases a scroll quantity of the display item displayed in the item display area taken as the display sequential order, and then changes the display item displayed in the item display area selected by the area selection device to another display item corresponding to the scroll quantity.

10. The sewing machine as claimed in claim 2, further comprising:
an area selection device that selects one of item display areas, the item display areas being a plurality of display areas provided in the display device;
a type storage device that stores types of the display items and the item display area in which the display item is to be displayed in association with each other, the types of the display items including at least a numeric value type of which the display item is a numeric value and a scroll type of which the display item is to be scrolled; and
a type determination device that determines the type of the display item displayed in the item display area selected by the area selection device, referring to the type storage device,
wherein if the type of the display item is determined to be the numeric value type by the type determination device, the second display change device increases or decreases the numeric value taken as the display sequential order, and then changes the numeric value defined as the display item displayed on the item display area selected by the area selection device to the increased or decreased numeric value, and, if the type of the display item is determined to be the scroll type by the type determination device, the second display change device increases or decreases a scroll quantity of the display item displayed in the item display area taken as the display sequential order, and then changes the display item displayed in the item display area selected by the area selection device to another display item corresponding to the scroll quantity.

11. The sewing machine as claimed in claim 3, wherein the operation quantity includes at least any of movement quantity and operation time of the operating member, and a number of times the operating member is operated.

12. A sewing machine operating program recorded on a non-transitory computer-readable recording medium, the program comprising;
first instructions for acquiring at least either an operation type or an operation quantity of plural types of operations including a first operation and a second operation, the second operation being different from the first operation; and
instructions for changing the display item being displayed responsive to at least either the operation type or the operation quantity acquired in the first instructions for acquiring, wherein the instructions for changing include:
instructions for detecting the operation type acquired in the first instructions for acquiring; and
instructions for first increasing or decreasing the display sequential order based on the first operation or the second operation detected in the instructions for detecting, assigning the first operation or the second operation to an increase or a decrease of the display sequential order, and changing the display item being displayed to another display item corresponding to the display sequential order.

13. A sewing machine operating program recorded on a non-transitory computer-readable recording medium, the program comprising;
first instructions for acquiring at least either an operation type or an operation quantity of plural types of operations including a first operation and a second operation, the second operation being different from the first operation; and
instructions for changing the display item being displayed responsive to at least either the operation type or the operation quantity acquired in the first instructions for acquiring, wherein the instructions for changing include:
instructions for detecting the operation quantity of the first operation or the second operation acquired in the first instructions for acquiring; and
instructions for second increasing or decreasing the display sequential order based on the operation quantity of the first operation or the second operation acquired in the first instructions for acquiring, assigning the operation quantity to a quantity of an increase or a decrease of the display sequential order, and changing the display item being displayed to another display item corresponding to the display sequential order.

14. The sewing machine operating program as claimed in claim 12, wherein the instructions changing include:
instructions for detecting an operation quantity of the first operation or the second operation acquired in the first instructions for acquiring; and
instructions for second increasing or decreasing the display sequential order based on the operation quantity of the first operation or the second operation acquired in the first instructions for acquiring, assigning the operation quantity to a quantity of an increase or a decrease of the display sequential order, and changing the display item being displayed to another display item corresponding to the display sequential order.

15. The sewing machine operating program as claimed in claim 12, further comprising:

instructions for sequentially assigning pages to the display items, wherein instructions for first increasing or decreasing displays the display item page by page, the page being assigned in the instructions for sequentially assigning, increases or decreases the display sequential order of the page, and then, changes the display item being displayed to another display item assigned to the page that corresponds to the display sequential order.

16. The sewing machine operating program as claimed in claim 13, further comprising:

instructions for sequentially assigning pages to the display items, wherein instructions for second increasing or decreasing displays the display item page by page, the page being assigned in the instructions for sequentially assigning, increases or decreases the display sequential order of the page, and then, changes the display item being displayed to another display item assigned to the page that corresponds to the display sequential order.

17. The sewing machine operating program as claimed in claim 15, wherein the instructions for sequentially assigning assigns the different pages to the display items of different categories, based on the categories classified in accordance with contents of the display items, and the display sequential order assigned so that the display items classified in the same category are continuous.

18. The sewing machine operating program as claimed in claim 16, wherein the instructions for sequentially assigning assigns the different pages to the display items of different categories, based on the categories classified in accordance with contents of the display items, and the display sequential order assigned so that the display items classified in the same category are continuous.

19. The sewing machine operating program as claimed in claim 12, further comprising:

second instructions for acquiring an item display area selected as a position in which the display item is to be changed, the instructions for changing changes the display item displayed in the item display area acquired in the second instructions for acquiring.

20. The sewing machine operating program as claimed in claim 12, further comprising:

second instructions for acquiring an item display area selected as a position in which the display item is to be changed; and instructions for determining whether a type of the display item to be displayed in the item display area is either a numeric value type of which the display item is a numeric value or a scroll type of which the display item is to be scrolled, based on the item display area acquired in the second instructions for acquiring, wherein if the type of the display item is determined to be the numeric value type in the instructions for determining, the instructions for first increasing or decreasing increases or decreases the numeric value taken as the display sequential order, and then changes the numeric value defined as the display item displayed in the item display area acquired in the second instructions for acquiring to the increased or decreased numeric value, and, if the type of the display item is determined to be the scroll type in the instructions for determining, the instructions for first increasing or decreasing increases or decreases a scroll quantity of the display item displayed in the item display area taken as the display sequential order, and then changes the display item displayed in the item display area acquired in the second instructions for acquiring to the display item corresponding to the scroll quantity.

21. The sewing machine operating program as claimed in claim 13, further comprising:

second instructions for acquiring an item display area selected as a position in which the display item is to be changed; and instructions for determining whether a type of the display item to be displayed in the item display area is either a numeric value type of which the display item is a numeric value or a scroll type of which the display item is to be scrolled, based on the item display area acquired in the second instructions for acquiring;

wherein if the type of the display item is determined to be the numeric value type in the instructions for determining, the instructions for second increasing or decreasing increases or decreases the numeric value taken as the display sequential order, and then changes the numeric value defined as the display item displayed in the item display area acquired in the second instructions for acquiring to the increased or decreased numeric value, and, if the type of the display item is determined to be the scroll type in the instructions for determining, the instructions for second increasing or decreasing increases or decreases a scroll quantity of the display item displayed in the item display area taken as the display sequential order, and then changes the display item displayed in the item display area acquired in the second instructions for acquiring to the display item corresponding to the scroll quantity.

22. The sewing machine as claimed in claim 2, further comprising:

an area selection device that selects one of item display areas, the item display areas being a plurality of display areas provided in the display device, wherein the display control device changes the display item displayed in the item display area selected by the area selection device.

23. The sewing machine as claimed in claim 2, wherein the operation quantity includes at least any of movement quantity and operation time of the operating member, and a number of times the operating member is operated.

24. The sewing machine operating program as claimed in claim 13, further comprising:

second instructions for acquiring an item display area selected as a position in which the display item is to be changed, the instructions for changing changes the display item displayed in the item display area acquired in the second instructions for acquiring.

* * * * *